United States Patent
Wolf et al.

(10) Patent No.: US 7,588,880 B2
(45) Date of Patent: Sep. 15, 2009

(54) INCORPORABLE PHOTOINITIATOR

(75) Inventors: Jean-Pierre Wolf, Maisprach (CH); Rinaldo Hüsler, Basel (CH); Wolfgang Peter, Neuenburg am Rhein (DE); Reinhard H. Sommerlade, Neuenburg am Rhein (DE); Souâd Boulmaâz, Birsfelden (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 226 days.

(21) Appl. No.: 10/512,300

(22) PCT Filed: Apr. 17, 2003

(86) PCT No.: PCT/EP03/04035

§ 371 (c)(1),
(2), (4) Date: Oct. 21, 2004

(87) PCT Pub. No.: WO03/091287

PCT Pub. Date: Nov. 6, 2003

(65) Prior Publication Data

US 2005/0228062 A1    Oct. 13, 2005

(30) Foreign Application Priority Data

Apr. 26, 2002  (CH) .................... 0717/02

(51) Int. Cl.
| | | |
|---|---|---|
| G03C 1/73 | (2006.01) | |
| G03C 1/735 | (2006.01) | |
| G03F 7/028 | (2006.01) | |
| C08F 2/50 | (2006.01) | |
| C07C 49/12 | (2006.01) | |

(52) U.S. Cl. ............ 430/281.1; 430/284.1; 522/90; 522/103; 522/8; 522/18; 522/39; 522/29; 522/37; 568/335

(58) Field of Classification Search ............ 522/34, 522/35, 39, 49, 58, 57, 8, 18, 29, 37, 90, 522/103; 430/281.1, 284.1; 568/335

See application file for complete search history.

(56) References Cited

U.S. PATENT DOCUMENTS

| | | | | |
|---|---|---|---|---|
| 3,930,868 A | | 1/1976 | Muzyczko et al. ............ 96/115 |
| 4,024,297 A | | 5/1977 | Gruber .................... 427/54 |
| 4,038,164 A | | 7/1977 | Via ................... 204/159.15 |
| 4,043,984 A | * | 8/1977 | Keil et al. ................ 525/519 |
| 4,279,718 A | | 7/1981 | Schuster et al. ....... 204/159.15 |
| 4,279,720 A | | 7/1981 | Berner ............... 204/159.23 |
| 4,308,394 A | | 12/1981 | Shuster et al. ............ 560/51 |
| 4,475,999 A | | 10/1984 | Via ................... 204/159.23 |
| 5,045,573 A | * | 9/1991 | Kohler et al. ............ 522/42 |
| 5,527,925 A | * | 6/1996 | Chabrecek et al. ........ 549/430 |
| 5,532,112 A | * | 7/1996 | Kohler et al. ........... 430/281.1 |
| 6,031,044 A | * | 2/2000 | Kokel et al. .............. 524/839 |
| 6,048,660 A | | 4/2000 | Leppard et al. ......... 430/270.1 |
| 6,444,721 B2 | * | 9/2002 | Schwalm et al. ............ 522/84 |
| 6,562,464 B1 | * | 5/2003 | Schwalm et al. ........ 428/411.1 |
| 6,878,843 B2 | * | 4/2005 | Kleiner ................... 560/75 |
| 7,193,005 B2 | * | 3/2007 | Leuninger et al. .......... 524/500 |
| 2003/0213931 A1 | | 11/2003 | Baudin et al. ............ 252/62 |
| 2004/0014832 A1 | | 1/2004 | Baudin et al. ............. 522/6 |
| 2005/0129859 A1 | * | 6/2005 | Misev et al. ............. 427/384 |

FOREIGN PATENT DOCUMENTS

| | | |
|---|---|---|
| EP | 0007059 | 1/1980 |
| FR | 2324648 | 4/1977 |
| WO | 00/56822 | 9/2000 |

* cited by examiner

Primary Examiner—Susan W Berman
(74) Attorney, Agent, or Firm—Tyler A. Stevenson

(57) ABSTRACT

Compounds of formula I

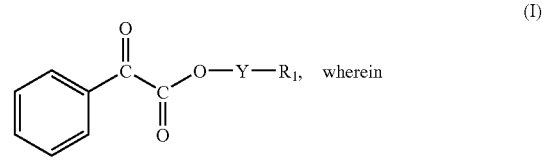

Y is, for example, $C_3$-$C_{12}$alkylene, butenylene, butynylene, or $C_4$-$C_{12}$alkylene interrupted one or more times by non-consecutive —O— or —$NR_2$—;

$R_1$ is a reactive group selected from OH, SH, $NR_3R_4$, —(CO)—OH, —(CO)—$NH_2$, $SO_3H$, —$C(R_5)$=$CR_6R_7$, oxiranyl, —O—(CO)—NH—$R_8$—NCO and —O—(CO)—$R_9$—(CO)—X;

$R_2$ is hydrogen, $C_1$-$C_4$alkyl or $C_2$-$C_4$hydroxyalkyl;

$R_3$ and $R_4$ are each independently of the other hydrogen, $C_1$-$C_4$alkyl or $C_2$-$C_4$hydroxyalkyl;

$R_5$, $R_6$ and $R_7$ are each independently of the others hydrogen or methyl;

$R_8$ is, for example, linear or branched $C_4$-$C_{12}$alkylene, or phenylene;

$R_9$ is, for example, linear or branched $C_1$-$C_{16}$alkylene, —CH=CH—, —CH=CH—$CH_2$—, $C_6$-cycloalkylene, phenylene or naphthylene; and X, $X_1$ and $X_2$ are each independently of the others OH, Cl, $OCH_3$ or $OC_2H_5$; are suitable as photoinitiators that can be incorporated in a formulation to be cured.

14 Claims, No Drawings

INCORPORABLE PHOTOINITIATOR

The invention relates to photoinitiators of the phenylglyoxylic acid type which, by virtue of their special substitution, are capable of being incorporated into the formulation to be polymerized.

Phenylglyoxylic acid derivatives are known as photoinitiators and are described, for example, in U.S. Pat. No. 4,038,164, U.S. Pat. No. 4,475,999 and U.S. Pat. No. 4,024,297. Compounds having two phenylglyoxylic acid ester functions in one molecule are known, for example, from U.S. Pat. No. 6,048,660 and WO 00/56822. Phenylglyoxylic acid derivatives provided with acrylate groups are disclosed in U.S. Pat. No. 3,930,868, U.S. Pat. No. 4,308,394 and U.S. Pat. No. 4,279,718.

There is a need in the art for reactive photoinitiators of low volatility that, in addition to excellent initiator properties and good dark-storage stability of the formulations with which they are mixed, offer broad scope for use also in formulations of complex composition, such as, for example, mixtures of thermally and photochemically curable components, it being possible for such photoinitiators, or products of photolysis thereof, to be bound in migration-fast manner in such formulations. It has now been found that some phenylglyoxylic acid esters are especially suitable as photoinitiators of low volatility. Those esters are compounds that become firmly bound in the coating during the polymerization reaction, migration of the initiator being prevented. The invention accordingly relates to incorporable photoinitiator compounds of formula I

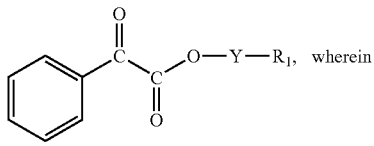

wherein

Y is $C_3$-$C_{12}$alkylene, butenylene, butynylene, or $C_4$-$C_{12}$alkylene interrupted one or more times by non-consecutive —O— or —$NR_2$—, or Y is phenylene, cyclohexylene,

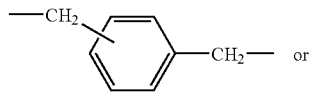

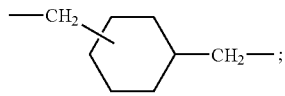

$R_1$ is a reactive group selected from OH, SH, $NR_3R_4$, —(CO)—OH, —(CO)—$NH_2$, $SO_3H$, —$C(R_5)$=$CR_6R_7$, oxiranyl, —O—(CO)—NH—$R_8$—NCO and —O—(CO)—$R_9$—(CO)—X;

$R_2$ is hydrogen, $C_1$-$C_4$alkyl or $C_2$-$C_4$hydroxyalkyl;

$R_3$ and $R_4$ are each independently of the other hydrogen, $C_1$-$C_4$alkyl or $C_2$-$C_4$hydroxyalkyl;

$R_5$, $R_6$ and $R_7$ are each independently of the others hydrogen or methyl;

$R_8$ is linear or branched $C_4$-$C_{12}$alkylene, phenylene, methyl-phenylene, cyclohexanediyl, isophoronediyl,

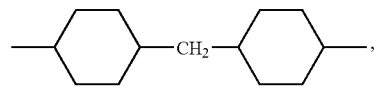

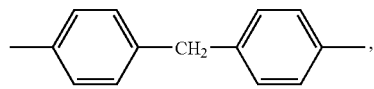

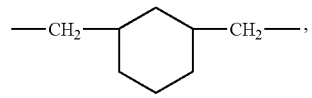

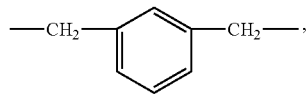

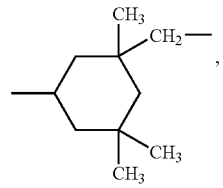

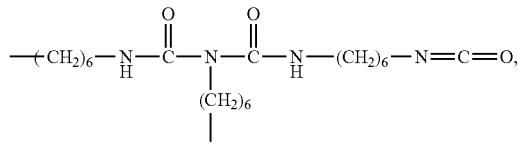

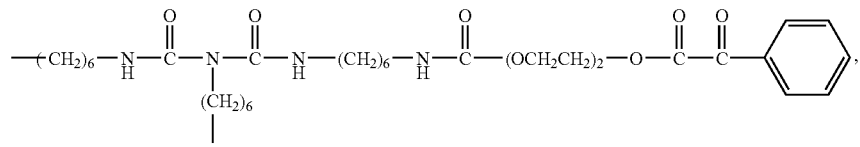

-continued

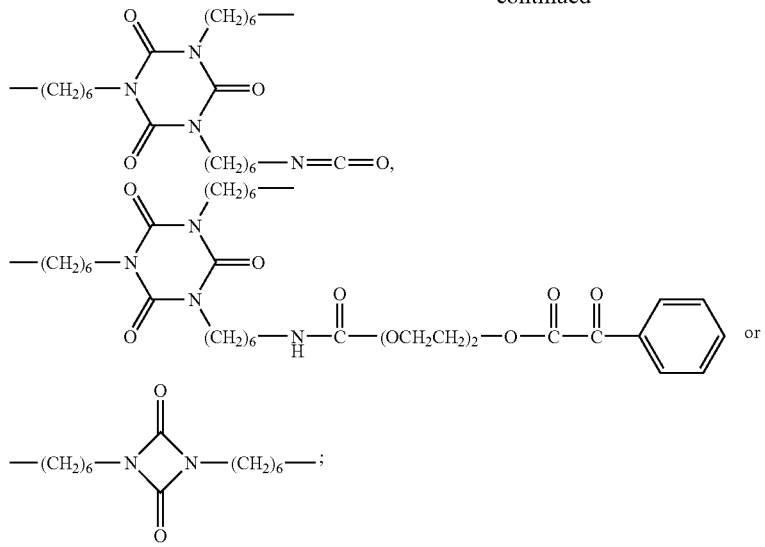

$R_9$ is linear or branched $C_1$-$C_{16}$alkylene, —CH=CH—, —CH=CH—CH$_2$—, $C_6$-cycloalkylene, phenylene, naphthylene, norbornene-5,6-diyl,

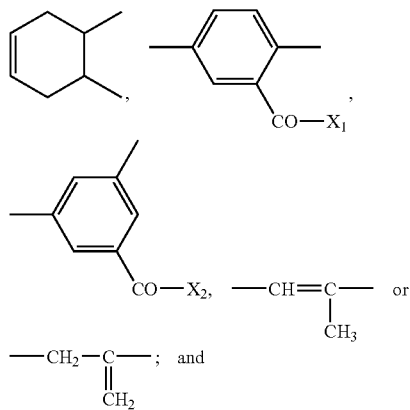

X, $X_1$ and $X_2$ are each independently of the others OH, Cl, OCH$_3$ or OC$_2$H$_5$.

A characteristic of the compounds of formula I is that the radical $R_1$ therein is a reactive group. By "reactive group" there are to be understood, in this context, radicals that are capable of reacting with the formulation to be polymerized and are thus anchored in the formulation. Migration of the photoinitiator is thereby reduced.

$C_1$-$C_4$Alkyl is linear or branched and is methyl, ethyl, propyl, isopropyl, n-butyl, sec-butyl or tert-butyl.

$C_2$-$C_4$Hydroxyalkyl is $C_2$-$C_4$alkyl substituted by one or more OH groups, alkyl being as defined above with the corresponding number of carbon atoms. Examples are hydroxyethyl, dihydroxypropyl, hydroxypropyl and dihydroxyethyl, especially hydroxyethyl.

$C_3$-$C_{12}$Alkylene is linear or branched alkylene, for example propylene, isopropylene, n-butylene, sec-butylene, isobutylene, tert-butylene, pentylene, hexylene, heptylene, octylene, nonylene, decylene, dodecylene

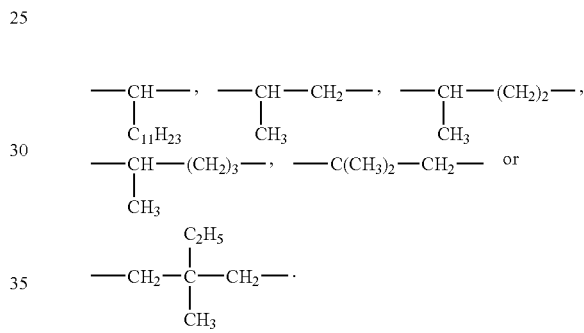

$C_4$-$C_{12}$Alkylene which is interrupted one or more times by non-consecutive —O— or —NR$_2$— produces structural units such as, for example, —CH$_2$CH$_2$—O—CH$_2$CH$_2$—, —[CH$_2$CH$_2$O]$_y$—, in which y=2-9, —(CH$_2$CH$_2$O)$_5$CH$_2$CH$_2$—, —CH$_2$—CH(CH$_3$)—O—CH$_2$—CH(CH$_3$)—, —CH$_2$CH$_2$—(NR$_2$)—CH$_2$CH$_2$—.

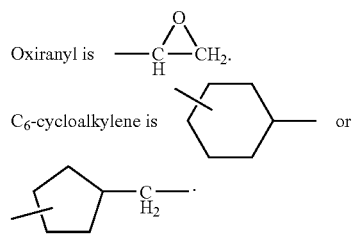

Preference is given to compounds of formula I wherein
Y is —CH$_2$—CH(CH$_3$)—, n-propylene, —CH$_2$C(CH$_3$)$_2$CH$_2$—, hexylene, —CH$_2$CH$_2$—O—CH$_2$CH$_2$, —(CH$_2$CH$_2$O)$_2$CH$_2$CH$_2$—,

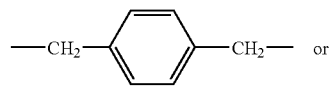

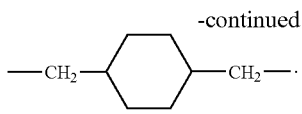

Compounds of formula I wherein $R_1$ is OH are of special interest.

Of interest especially is a compound wherein $R_1$ is OH and Y is —CH$_2$CH$_2$—O—CH$_2$CH$_2$—.

Also of interest, more especially, are incorporable photoinitiators of formula I wherein Y is $C_4$-$C_{12}$alkylene interrupted one or more times by non-consecutive —O—;

$R_1$ is a reactive group selected from OH, oxiranyl and —O—(CO)—NH—$R_8$—NCO; and I. The compounds of formula I of the invention can be prepared, for example, by reacting diols (by means of which compounds of formula I wherein $R_1$=OH are obtained) or functionalised alcohols HO—Y—$R_1$ (A) with phenylglyoxylic acid monoesters (B), for example the corresponding methyl ester, in the presence of a catalyst:

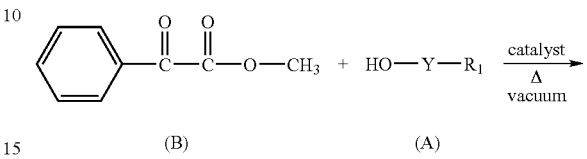

$R_8$ is 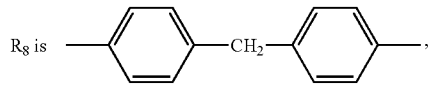 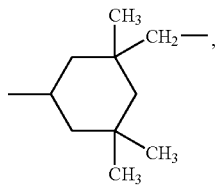

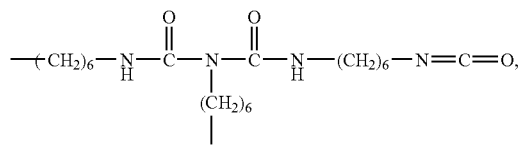

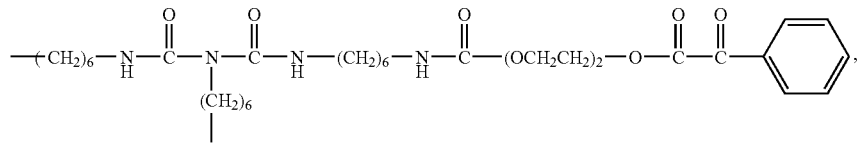

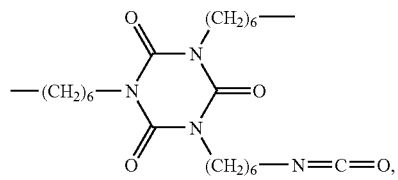

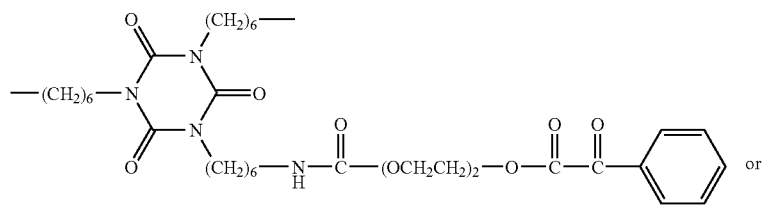 or

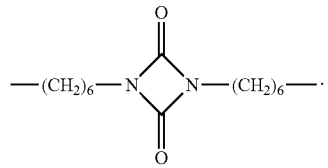

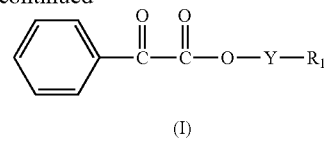

wherein $R_1$ is as defined hereinabove.

As catalyst there may be used, for example, the catalysts familiar to the person skilled in the art for transesterification reactions, for example dibutyltin oxide or p-toluenesulfonic acid. Some catalysts, although suitable for carrying out the reaction, cause discoloration of the products or are toxic, or are difficult to remove from the reaction mixture.

Suitable catalysts include sodium acetate, potassium acetate, magnesium acetate, barium acetate, zinc acetate, cadmium acetate, copper(II) acetate, cobalt (II) acetate, aluminium acetate, calcium oxide, lithium methanolate, sodium methanolate, titanium tetraiso-propanolate, aluminium tri-isopropanolate; lithium tert-butanolate, 4-(dimethylamino)pyridine and dibutyltin diacetate (=Fascat 4200) [the catalytic action of the acetates listed is independent of the content of water of crystallisation].

There are suitable, for example, especially various lithium salts, e.g. lithium isopropanolate, lithium acetate, lithium carbonate. Lithium acetate and calcium oxide are preferred.

Lithium acetate is particularly suitable as catalyst, especially in the preparation of compounds of formula I wherein $R_1$=OH.

The amount of catalyst is, for example, from 0.1 to 20 mol %, based on the glyoxylic ester component (B), but even larger amounts can be used without adversely affecting the course of the reaction. Preferably, 4 mol % of catalyst are used.

Advantageously, an excess of alcohol (A) is added and the methanol formed during the reaction is distilled off by applying a reduced vacuum (about from 5 to 300 torr). The reaction can be carried out at normal pressure or in vacuo, the particular alcohol formed being distilled off in each case. Suitable pressures are from 0.001 mbar to 1000 mbar, preferably from 5 to 10 mbar.

The amount of diethylene glycol used may be, for example, from 1 equivalent to 100 equivalents, based on phenylglyoxylic acid methyl ester (1 equivalent); preferably, 10 equivalents are used.

The temperature for the reaction may be from 20° C. to 180° C. The reaction is carried out preferably at from 40 to 120° C., especially at from 50 to 60° C.

It is possible, for example, for any lower ester to be used as the glyoxylic acid component (B) (methyl, ethyl, n-propyl, isopropyl, n-butyl, isobutyl or sec-butyl ester, etc.).

The reaction time is generally from 2 to 80 hours, preferably from 10 to 20 hours.

As solvent for the transesterification reaction there may be used, for example, aromatic solvents, such as benzene, toluene, cumene, o-, m- or p-xylene or isomeric mixtures thereof, but it is also possible to use ethers, such as diethyl ether, diisopropyl ether, butyl methyl ether, tert-butyl methyl ether, 1,4-dioxane, tetrahydrofuran etc., or also hydrocarbons having a boiling point above 70° C. Preferably, the reaction is carried out without the addition of a solvent.

Working up is carried out, for example, by washing the reaction mixture with water (removal of the catalyst and unreacted diethylene glycol); drying is carried out, for example, by the addition of a solvent that forms an azeotrope with water (e.g. toluene) and by azeotropic distillation. Any diethylene glycol diester formed in the reaction is removed by extraction using a suitable organic solvent from the series benzene, toluene, cumene, o-, m- or p-xylene or isomeric mixtures thereof, and/or diethyl ether, diisopropyl ether, butyl methyl ether, tert-butyl methyl ether, 1,4-dioxane etc.

Working up can furthermore also be carried out, for example, by column chromatography (removal of undesired by-products). A preferred eluant mixture for the elution is ethyl acetate/hexane or other hydrocarbons (heptane, petroleum ether etc.). The ratio of ethyl acetate to hydrocarbon may be from 90:10 to 30:70 and is preferably 50:50.

II. A further possible method of obtaining the compounds of the invention comprises the base-catalysed reaction of a phenylglyoxylic acid halide (C), preferably a phenylglyoxylic acid chloride, with an alcohol (A):

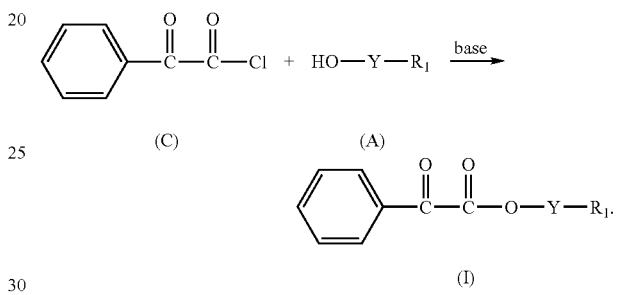

The bases used for such reactions are familiar to the person skilled in the art. Aqueous bases are not used. Examples of suitable bases include carbonates, tert-amine bases, for example triethylamine, and pyridine.

IIb. A further possible method of obtaining the compounds of the invention comprises the catalysed reaction of phenylglyoxylic acid (S) with an alcohol (A) and an addition of dicyclohexylcarbodiimide (DCC):

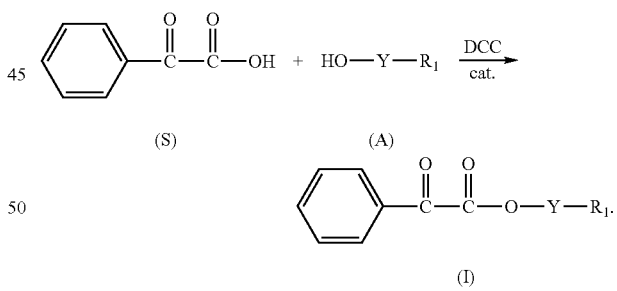

III. The compounds of the invention can furthermore be obtained, for example, by reaction of alcohols (A) with corresponding phenylacetic acid esters (D) in the presence of a catalyst and subsequent oxidation:

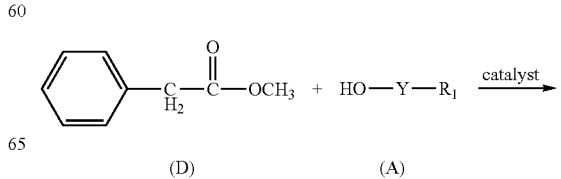

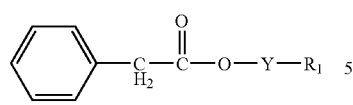

↓ [O]

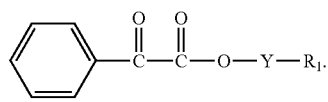

(I)

As catalysts there may be used, for example, those described under I.

The oxidation step can be carried out, for example, as described in *J. Chem. Soc. Chem. Comm.* (1993), 323 or in *Synthesis* (1994), 915.

IV. As a further method of preparing the compounds of formula I of the invention there comes into consideration, for example, the reaction of corresponding hydroxy-substituted phenyl acetates (E) with alcohols (A) and subsequent oxidation:

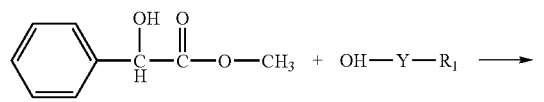

(E)   (A)

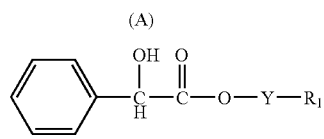

↓ [O]

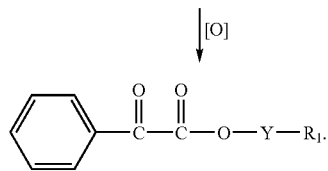

(I)

The oxidation can be carried out, for example, in accordance with the method described in *J. Chem. Soc. Chem. Comm.* (1994), 1807.

V. A further possible method of preparing the compounds of formula I of the invention comprises the acid-catalysed reaction of phenylcarboxylic acid cyanides (F) with alcohols (A):

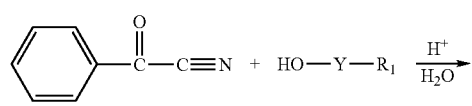

(F)   (A)

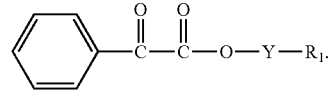

(I)

VI. The compounds of formula I of the invention can also be obtained, for example, by Friedel-Crafts reaction of phenyl with dimeric oxocarboxylic acid chlorides (H) in the presence of aluminium chloride:

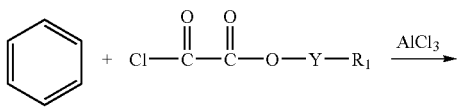

(H)

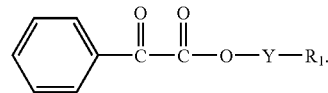

(I)

The catalysts that may be used are those familiar to the person skilled in the art that are customary for Friedel-Crafts reactions, for example tin chloride, zinc chloride, aluminium chloride, titanium chloride or acid earths.

Reactions I, IIb, III and IV can generally be carried out without the use of a solvent by having one of the reactants, which is liquid, for example the alcohol, act as the solvent. It is, however, also possible for the reactions to be carried out in an inert solvent. Suitable solvents include, for example, aliphatic and aromatic hydrocarbons, e.g. alkanes and alkane mixtures, cyclohexane, benzene, toluene and xylene. The boiling point of such solvents should, of course, advantageously be higher than that of the alcohol that forms during the reaction.

The other remaining syntheses listed above are advantageously carried out in an inert solvent; the solvents listed above, for example, are suitable.

It is advantageous in reactions I, III and IV to ensure that the alcohol that forms during the reaction is removed from the reaction mixture. This is effected, for example, by distillation and, as described under I, where appropriate with the application of a vacuum.

The reactions are carried out at various temperatures, according to the solvents and starting materials employed. The temperatures and other reaction conditions necessary for the reactions in question are generally known and familiar to the person skilled in the art.

The reaction products can be separated and purified according to generally customary methods, such as, for example, by crystallisation, distillation, extraction or chromatography.

The preparation of the starting materials required for the synthesis of the compounds of formula I of the invention is generally known and is familiar to the person skilled in the art. Some derivatives of the starting materials (B), (C), (D) and (F) are, for example, even obtainable commercially.

For example, the phenylglyoxylic acid esters (B) are obtained by Friedel-Crafts reaction from phenyl and the appropriate oxocarboxylic acid methyl ester chloride, or by esterification of phenylglyoxylic acid chlorides (C) with alcohols.

Phenylglyoxylic acid chlorides (C) can be obtained, for example, by chlorination, for example with $SOCl_2$, of the appropriate acid.

Phenylcarboxylic acid cyanides (F) can be obtained, for example, by reaction of the appropriate acid chlorides with CuCN.

It is possible to prepare phenylacetic acid methyl esters (D), for example, by acid-catalysed reaction of phenyl-$CH_2CN$ with methanol. That reaction is described, for example, in *Org. Syn. Coll. Vol. I*, 270. The corresponding phenyl-$CH_2$-cyanides can be obtained, for example, from the corresponding chlorides using NaCN, as disclosed, for example, in *Org. Syn. Coll.* Vol. I, 107 and *Org. Syn. Coll.* Vol. IV, 576.

The synthesis of phenylacetic acid ethyl esters (D) is described, for example, in *J. Chem. Soc. Chem. Comm* (1969), 515, in which process the corresponding phenyl bromide is reacted with $N_2CH_2COOC_2H_5$ in the presence of lithium/diethyl ether, CuBr. Another method, the reaction of phenyl bromides with ethyl acetate and NaH, is described, for example, in *J. Am. Chem. Soc.* (1959) 81, 1627. *J. Org. Chem.* (1968) 33, 1675 describes the Grignard reaction of phenyl bromides with $BrCH_2COOC_2H_5$ to form the phenylacetic acid ethyl ester (D).

The preparation of the alcohols (A) is familiar to the person skilled in the art and is described extensively in the literature. Many such compounds are obtainable commercially.

Compounds of formula I wherein $R_1$ is hydroxyl are of special interest. Such compounds can also be used as starting materials in the preparation of compounds of formula I that are functionalised in $R_1$ in some other way.

The invention accordingly relates also to a process for the preparation of compounds of formula I, as defined hereinabove, wherein $R_1$ is OH, by reaction of phenylglyoxylic acid monoesters of formula II

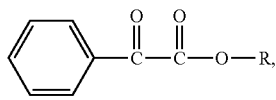

(II)

wherein

R is $C_1$-$C_4$alkyl, especially methyl or ethyl, with diols of formula III

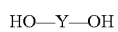 (III), wherein

Y is as defined hereinabove, wherein there is used as the catalyst lithium acetate, sodium acetate, potassium acetate, magnesium acetate, barium acetate, zinc acetate, cadmium acetate, copper(II) acetate, cobalt (II) acetate, aluminium acetate, calcium oxide, lithium methanolate, sodium methanolate, titanium tetraisopropanolate, aluminium triisopropanolate, lithium tert-butanolate, 4-(dimethylamino)pyridine or dibutyltin diacetate.

Further details concerning the reaction conditions are given hereinabove under I.

Of interest is a process wherein lithium acetate is used as the catalyst, and also a process wherein the reaction is carried out at temperatures of from 20° C. to 180° C.

Preferably, the amount of catalyst is from 0.1 to 20 mol %, based on the glyoxylic ester component of formula (II).

The compounds of formula I wherein $R_1$ is OH are photoinitiators that are incorporable as such, but they can also be used in the preparation of other incorporable photoinitiators. Incorporable photoinitiators according to the invention derived from compounds of formula I wherein $R_1$ is OH (referred to hereinafter as compounds of formula Ia) are, for example: urethanes derived from isocyanates and compounds of formula Ia; urethanes derived from carbamoyl chlorides and compounds of formula Ia; thiourethanes derived from thioisocyanates and compounds of formula Ia; acid esters derived from acids, acid chlorides, acid esters, acid anhydrides or phthalic acid anhydrides and compounds of formula Ia; carbonates derived from chloroformates and compounds of formula Ia; glycidyl ethers and glycerol diethers derived from epichlorohydrin and compounds of formula Ia.

Polyvalent reaction partners of compounds of formula Ia yield, when the compounds of formula Ia are used in less than stoichiometric amounts, products which themselves still have free unreacted functions which are incorporable.

In that connection, the use of $C_6H_5$—(CO)—(CO)—O—$CH_2$—$CH_2$—O—$CH_2$—$CH_2$—OH as starting material in the preparation of compounds of formula I that are functionalised in $R_1$ other than with OH is of special interest.

The following are examples of the use of a compound of formula Ia as an intermediate in the preparation of other incorporable photoinitiators:

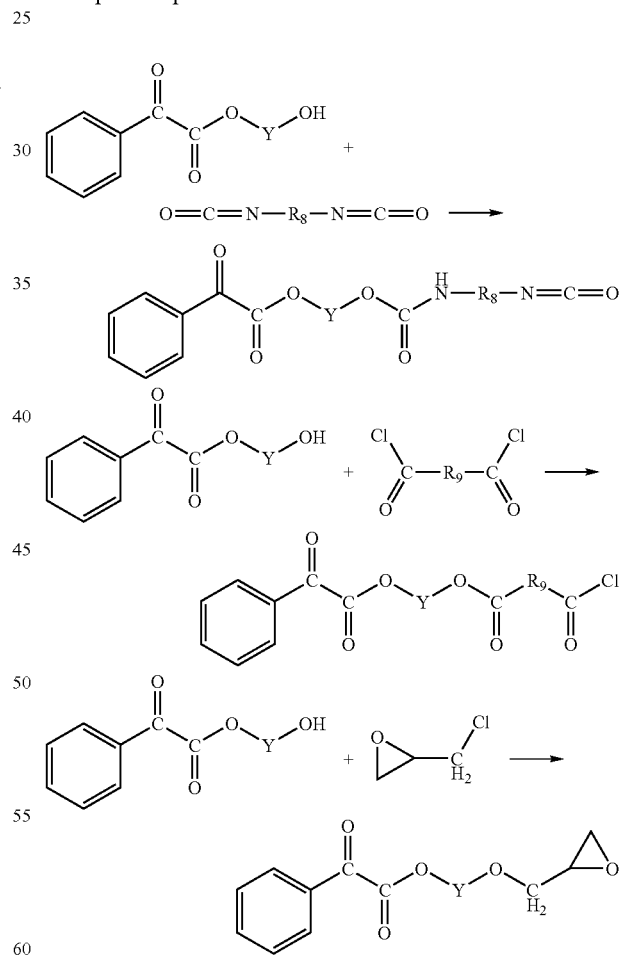

wherein $R_8$, $R_9$ and Y are as defined hereinabove.

The invention accordingly relates also to the use of a compound of formula I wherein $R_1$ is OH as a starting material in the preparation of incorporable photoinitiators wherein $R_1$ is SH, $NR_3R_4$, —(CO)—OH, —(CO)—$NH_2$, $SO_3H$, —C($R_5$)

=CR$_6$R$_7$, oxiranyl, —O—(CO)—NH—R$_8$—NCO or —O—(CO)—R$_9$—(CO)—X; and the radicals R$_3$, R$_4$, R$_5$, R$_6$, R$_7$, R$_8$, R$_9$ and X are as defined hereinabove.

The invention relates also to a process for the preparation of incorporable photoinitiators of formula I in which a compound of formula I wherein R$_1$ is OH is reacted with an isocyanate, a carbamoyl chloride, a thioisocyanate, an acid chloride, an acid ester, an acid anhydride, a chloroformate or epichlorohydrin.

As reaction partners for the preparation of incorporable photoinitiators starting from compounds of formula I wherein R$_1$ is OH there are also suitable especially diisocyanates and oligoisocyanates, which are, for example, technical mixtures comprising hexamethylene diisocyanate, 1,6-diisocyanatohexane, tolylene-2,4-diisocyanate, 4-methyl-m-phenylene diisocyanate, 2,4-diisocyanato-1-methyl-cyclohexane, 1,3-bisisocyanatomethylbenzene, m-xylylene diisocyanate, 1,3-bisisocyanatomethyl-cyclohexane, isophorone diisocyanate, 5-isocyanato-1-isocyanatomethyl-1,1,3-trimethylcyclohexane, 3-isocyanatomethyl-3,3,5-trimethylcyclohexyl isocyanate, diphenylmethane 4,4'-diisocyanate, 4,4'-diphenylmethane diisocyanate, bis(4-isocyanatophenyl)methane, 4,4-oxybis(phenyl isocyanate), 4,4'-diisocyanato-3,3'-dimethyldiphenylmethane, bis(4-isocyanato-3-methylphenyl)methane, dicyclohexylmethane 4,4'-diisocyanate, 1,3,5-tris(6-isocyanatohexyl)-[1,3,5]triazinane-2,4,6-trione, 1,3,5-tris(6-isocyanatohexyl)biuret, N,N',2-tris(6-isocyanatohexyl)imidodicarboxylic acid diamide, 1,3-bis(6-isocyanatohexyl)-[1,2]diazetidine-2,4-dione, 2,5-2,6-exo/endo-bisisocyanatomethyl-norbornane, 1,6-diisocyanato-2,2,4-trimethylhexane.

Corresponding commercial products are marketed under the name "Desmodur" by Bayer AG.

Where isocyanate-modified compounds of formula I are used in photocurable compositions such as are described hereinbelow, it is, for example, advantageous also to use corresponding isocyanate resins as the curable component. In that way the compatibility of the photoinitiator with the formulation to be cured is increased.

According to the invention, the compounds of formula I can be used as photoinitiators in the photopolymerization of ethylenically unsaturated compounds or of mixtures comprising such compounds.

Use thereof can also be in combination with a different photoinitiator and/or other additives.

The invention therefore relates also to photopolymerizable compositions comprising (a) at least one ethylenically unsaturated photopolmerisable compound and (b) as photoinitiator, at least one compound of formula I, it being possible for the composition to contain, in addition to component (b), also other photoinitiators (c) and/or other additives (d).

The unsaturated compounds may contain one or more olefinic double bonds. They may be low molecular weight (monomeric) or higher molecular weight (oligomeric). Examples of monomers having a double bond are alkyl and hydroxyalkyl acrylates and methacrylates, e.g. methyl, ethyl, butyl, 2-ethylhexyl and 2-hydroxyethyl acrylate, isobornyl acrylate and methyl and ethyl methacrylate. Also of interest are silicon- or fluorine-modified resins, e.g. silicone acrylates. Further examples include acrylonitrile, acrylamide, methacrylamide, N-substituted (meth)acrylamides, vinyl esters, such as vinyl acetate, vinyl ethers, such as isobutyl vinyl ether, styrene, alkyl- and halo-styrenes, N-vinylpyrrolidone, vinyl chloride and vinylidene chloride.

Examples of monomers having several double bonds are ethylene glycol diacrylate, propylene glycol diacrylate, neopentyl glycol diacrylate, hexamethylene glycol diacrylate and bisphenol A diacrylate, 4,4'-bis(2-acryloyloxyethoxy)diphenylpropane, trimethylolpropane triacrylate, pentaerythritol triacrylate and pentaerythritol tetraacrylate, vinyl acrylate, divinylbenzene, divinyl succinate, diallyl phthalate, triallyl phosphate, triallyl isocyanurate and tris(2-acryloylethyl)isocyanurate.

Examples of higher molecular weight (oligomeric) polyunsaturated compounds are acrylated epoxy resins, acrylated or vinyl-ether- or epoxy-group-containing polyesters, polyurethanes and polyethers. Further examples of unsaturated oligomers are unsaturated polyester resins, which are usually produced from maleic acid, phthalic acid and one or more diols and have molecular weights of about from 500 to 3000. In addition it is also possible to use vinyl ether monomers and oligomers, and also maleate-terminated oligomers having polyester, polyurethane, polyether, polyvinyl ether and epoxide main chains. Combinations of vinyl-ether-group-carrying oligomers and polymers, as described in WO 90/01512, are especially suitable, but copolymers of monomers functionalised with maleic acid and vinyl ether also come into consideration. Such unsaturated oligomers can also be termed prepolymers.

Especially suitable are, for example, esters of ethylenically unsaturated carboxylic acids and polyols or polyepoxides, and polymers having ethylenically unsaturated groups in the chain or in side groups, e.g. unsaturated polyesters, polyamides and polyurethanes and copolymers thereof, alkyd resins, polybutadiene and butadiene copolymers, polyisoprene and isoprene copolymers, polymers and copolymers having (meth)acrylic groups in side chains, and also mixtures of one or more such polymers.

Examples of unsaturated carboxylic acids are acrylic acid, methacrylic acid, crotonic acid, itaconic acid, cinnamic acid and unsaturated fatty acids such as linolenic acid or oleic acid. Acrylic and methacrylic acid are preferred.

Suitable polyols are aromatic and especially aliphatic and cycloaliphatic polyols. Examples of aromatic polyols are hydroquinone, 4,4'-dihydroxydiphenyl, 2,2-di(4-hydroxyphenyl)-propane, and novolaks and resols. Examples of polyepoxides are those based on the said polyols, especially the aromatic polyols and epichlorohydrin. Also suitable as polyols are polymers and copolymers that contain hydroxyl groups in the polymer chain or in side groups, e.g. polyvinyl alcohol and copolymers thereof or polymethacrylic acid hydroxyalkyl esters or copolymers thereof. Further suitable polyols are oligoesters having hydroxyl terminal groups.

Examples of aliphatic and cycloaliphatic polyols include alkylenediols having preferably from 2 to 12 carbon atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may be partially or fully esterified by one or by different unsaturated carboxylic acid(s), it being possible for the free hydroxyl groups in partial esters to be modified, for example etherified, or esterified by other carboxylic acids.

Examples of esters are:

trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentaacrylate, sorbitol hexaacrylate, oligoester acrylates and methacrylates, glycerol di- and tri-acrylate, 1,4-cyclohexane diacrylate, bisacrylates and bismethacrylates of polyethylene glycol having a molecular weight of from 200 to 1500, and mixtures thereof.

Also suitable as component (a) are the amides of identical or different unsaturated carboxylic acids and aromatic, cycloaliphatic and aliphatic polyamines having preferably from 2 to 6, especially from 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, di-β-aminoethyl ether, diethylenetriamine, triethylenetetramine and di(β-aminoethoxy)- and di(β-aminopropoxy)ethane. Further suitable polyamines are polymers and copolymers which may have additional amino groups in the side chain and oligoamides having amino terminal groups. Examples of such unsaturated amides are: methylene bisacrylamide, 1,6-hexamethylene bisacrylamide, diethylenetriamine trismethacrylamide, bis(methacrylamidopropoxy)ethane, β-methacrylamidoethyl methacrylate and N-[(β-hydroxyethoxy)ethyl]-acrylamide.

Suitable unsaturated polyesters and polyamides are derived, for example, from maleic acid and diols or diamines. The maleic acid may have been partially replaced by other dicarboxylic acids. They may be used together with ethylenically unsaturated comonomers, e.g. styrene. The polyesters and polyamides may also be derived from dicarboxylic acids and ethylenically unsaturated diols or diamines, especially from those having longer chains of e.g. from 6 to 20 carbon atoms. Examples of polyurethanes are those composed of saturated diisocyanates and unsaturated diols or unsaturated diisocyanates and saturated diols.

Polybutadiene and polyisoprene and copolymers thereof are known. Suitable comonomers include, for example, olefins, such as ethylene, propene, butene and hexene, (meth)acrylates, acrylonitrile, styrene and vinyl chloride. Polymers having (meth)acrylate groups in the side chain are likewise known. Examples are reaction products of novolak-based epoxy resins with (meth)acrylic acid; homo- or co-polymers of vinyl alcohol or hydroxyalkyl derivatives thereof that have been esterified with (meth)acrylic acid; and homo- and co-polymers of (meth)acrylates that have been esterified with hydroxyalkyl (meth)acrylates.

Suitable components (a) also include acrylates that have been modified by reaction with primary or secondary amines, as is described, for example, in U.S. Pat. No. 3,844,916, EP 280 222, U.S. Pat. No. 5,482,649 or U.S. Pat. No. 5,734,002. Such amine-modified acrylates are also termed aminoacrylates. Aminoacrylates are obtainable, for example, under the name ™EBECRYL 80, ™EBECRYL 81, ™EBECRYL 83, ™EBECRYL 7100 from UCB Chemicals, under the name ™Laromer PO 83F, ™Laromer PO 84F, ™Laromer PO 94F from BASF, under the name ™PHOTOMER 4775 F, ™PHOTOMER 4967 F from Cognis or under the name ™CN501, ™CN503, ™CN550 from Cray Valley.

The photopolymerizable compounds can be used on their own or in any desired mixtures. Preferably mixtures of polyol (meth)acrylates are used.

Binders may also be added to the compositions according to the invention, this being particularly advantageous when the photopolymerizable compounds are liquid or viscous substances. The amount of binder may be, for example, from 5 to 95% by weight, preferably from 10 to 90% by weight and especially from 40 to 90% by weight, based on total solids. The choice of the binder is made in accordance with the field of use and the properties required therefor, such as developability in aqueous and organic solvent systems, adhesion to substrates and sensitivity to oxygen.

Suitable binders are, for example, polymers having a molecular weight of approximately from 5000 to 2 000 000, preferably from 10 000 to 1 000 000. Examples are: homo- and co-polymers of acrylates and methacrylates, e.g. copolymers of methyl methacrylate/ethyl acrylate/methacrylic acid, poly(methacrylic acid alkyl esters), poly(acrylic acid alkyl esters); cellulose esters and ethers, such as cellulose acetate, cellulose acetate butyrate, methylcellulose, ethylcellulose; polyvinylbutyral, polyvinylformal, cyclised rubber, polyethers such as polyethylene oxide, polypropylene oxide, polytetrahydrofuran; polystyrene, polycarbonate, polyurethane, chlorinated polyolefins, polyvinyl chloride, copolymers of vinyl chloride/vinylidene chloride, copolymers of vinylidene chloride with acrylonitrile, methyl methacrylate and vinyl acetate, polyvinyl acetate, copoly(ethylene/vinyl acetate), polymers such as polycaprolactam and poly(hexamethylene adipamide), polyesters such as poly(ethylene glycol terephthalate) and poly(hexamethylene glycol succinate).

The unsaturated compounds can also be used in admixture with non-photopolymerizable film-forming components. These may be, for example, physically drying polymers or solutions thereof in organic solvents, for example nitrocellulose or cellulose acetobutyrate, but they may also be chemically or thermally curable resins, for example polyisocyanates, polyepoxides or melamine resins. The concomitant use of thermally curable resins is important for use in so-called hybrid systems, which are photopolymerized in a first step and crosslinked by thermal after-treatment in a second step.

The photoinitiators according to the invention are also suitable as initiators for curing systems that dry oxidatively, such as are described, for example, in Lehrbuch der Lacke und Beschichtungen, volume III, 296-328, Verlag W. A. Colomb in der Heenemann GmbH, Berlin-Oberschwandorf (1976).

The compounds according to the invention, for example compounds of formula I wherein $R_1$ is OH, are suitable especially also as photoinitiators in hybrid binder systems. Such systems generally comprise at least one thermally curing constituent and one photochemically curing constituent. The thermally curing constituent is normally a two-component or multi-component reactive resin preferably of the polyol/polyisocyanate type. As photochemically curing constituent there come into consideration all monomeric, oligomeric or polymeric unsaturated compounds and combinations thereof customary for that purpose, the polymerization or crosslinking of which is effected by the action of high-energy radiation and with the aid of a photoinitiator. Such compounds are described in detail hereinabove. Suitable examples also include the isocyanates of the "Desmodur series" described hereinabove. Thermal/photochemical hybrid systems can be obtained by mixing together all the components, the isocyanate component advantageously being added only shortly prior to use, as is customary for polyurethane-forming reactive resins, in order to avoid premature full cure of the thermally polymerizing constituent. For the full cure of coatings prepared with such hybrid systems, the coatings are first of all irradiated in the manner customary for radiation-curable systems, in the course of which rapid surface-drying and initial curing of the layer are achieved. The finally cured state is achieved when the thermal reaction, which can also be accelerated by the application of heat, is complete. It is, however, also possible for curing to be carried out first thermally and then with UV. An advantage of such systems compared with the slow-drying systems based on purely thermally reactive resin is the considerable saving in time and energy; it is possible for the coated articles to be stacked immediately or further processed more quickly.

An advantage of the use of the photoinitiators according to the invention in hybrid binder systems is that, unlike in the case of conventional photoinitiators, virtually no photoinitiator residues or products of photolysis thereof can be detected in the final fully cured polymer material. The polymer products accordingly exhibit greater final hardness; the incidence of adverse effects caused by initiator, such as, for example, odour or yellowing, is far less. By virtue of the OH group, covalent incorporation of the photoinitiator according to the invention into the polymer material is effected by means of reaction with equivalent amounts of the isocyanate component of the thermally curing constituent in the hybrid binder system.

The invention accordingly relates also to compositions as described hereinabove that, in addition to comprising the photochemically curing component and component (b), as well as, where appropriate, (c) and (d), also comprise a thermally curable component.

Compounds of formula I wherein $R_1$ is OH can also be covalently fixed both in purely radiation-curable systems and in hybrid systems by esterification with carboxylic acid group-containing components. Examples of such components include, for instance, terephthalic acid, pyromellitic acid and anhydrides thereof and also oligomers or polymers thereof derived from such compounds and still containing at least one free carboxylic acid function.

The photopolymerizable mixtures may also contain various additives (d) in addition to the photoinitiator. Examples thereof are thermal inhibitors, which are intended to prevent pre-mature polymerization, e.g. hydroquinone, hydroquinone derivatives, p-methoxyphenol, β-naphthol or sterically hindered phenols, e.g. 2,6-di(tert-butyl)-p-cresol. In order to increase dark-storage stability it is possible to use, for example, copper compounds, such as copper naphthenate, stearate or octoate, phosphorus compounds, for example triphenylphosphine, tributylphosphine, triethyl phosphite, triphenyl phosphite or tribenzyl phosphite, quaternary ammonium compounds, e.g. tetramethylammonium chloride or trimethylbenzylammonium chloride, or hydroxylamine derivatives, e.g. N-diethylhydroxylamine. For the purpose of excluding atmospheric oxygen during polymerization, it is possible to add paraffin or similar wax-like substances which, being insoluble in the polymer, migrate to the surface at the beginning of the polymerization and form a transparent surface layer which prevents air from entering. Equally possible is the application of a layer that is impermeable to oxygen. As light stabilizers it is possible to add UV absorbers, e.g. those of the hydroxyphenylbenzotriazole, hydroxyphenylbenzophenone, oxalic acid amide or hydroxyphenyl-s-triazine type. Such compounds can be used on their own or in the form of mixtures, with or without the use of sterically hindered amines (HALS).

The following are examples of such UV absorbers and light stabilizers:

1. 2-(2'-Hydroxyphenyl)-benzotriazoles, e.g. 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis(α,α-dimethylbenzyl)-2'-hydroxyphenyl)-benzotriazole, a mixture of 2-(3'-tert-butyl-2'-hydroxy-5'-(2-octyloxycarbonylethyl)-phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)-phenyl)-5-chlorobenzotriazole, 2-(3'-tert-butyl-2'-hydroxy-5'-(2-methoxycarbonylethyl) phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethyl-hexyloxy)-carbonylethyl]-2'-hydroxyphenyl)-benzotriazole, 2-(3'-dodecyl-2'-hydroxy-5'-methylphenyl)-benzotriazole and 2-(3'-tert-butyl-2'-hydroxy-5'-(2-isooctyloxycarbonylethyl)-phenyl)-benzotriazole, 2,2'-methylene-bis[4-(1,1,3,3-tetramethylbutyl)-6-benzotriazole-2-yl-phenol]; the transesterification product of 2-[3'-tert-butyl-5'-(2-methoxycarbonylethyl)-2'-hydroxyphenyl]-benzotriazole with polyethylene glycol 300; [R—CH$_2$CH$_2$—COO(CH$_2$)$_3$]$_2$— wherein R=3'-tert-butyl-4'-hydroxy-5'-2H-benzotriazol-2-yl-phenyl.

2. 2-Hydroxybenzophenone, e.g. a 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivative.

3. Esters of unsubstituted or substituted benzoic acids, e.g. 4-tert-butyl-phenyl salicylate, phenyl salicylate, octylphenyl salicylate, dibenzoylresorcinol, bis(4-tert-butylbenzoyl)-resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester and 3,5-di-tert-butyl-4-hydroxybenzoic acid 2-methyl-4,6-di-tert-butylphenyl ester.

4. Acrylates, e.g. α-cyano-β,β-diphenylacrylic acid ethyl ester or isooctyl ester, α-methoxy-carbonylcinnamic acid methyl ester, α-cyano-β-methyl-p-methoxycinnamic acid methyl ester or butyl ester, α-methoxycarbonyl-p-methoxycinnamic acid methyl ester and N-(β-methoxy-carbonyl-β-cyanovinyl)-2-methyl-indoline.

5. Sterically hindered amines, e.g. bis(2,2,6,6-tetramethylpiperidyl)sebacate, bis(2,2,6,6-tetramethylpiperidyl)succinate, bis(1,2,2,6,6-pentamethylpiperidyl)sebacate, n-butyl-3,5-di-tert-butyl-4-hydroxybenzyl-malonic acid bis(1,2,2,6,6-pentamethylpiperidyl) ester, the condensation product of 1-hydroxyethyl-2,2,6,6-tetramethyl-4-hydroxypiperidine and succinic acid, the condensation product of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)-1,2,3,4-butanetetraoate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, the condensation product of N,N'-bis(2,2,6,6-tetramethyl-4-piperidyl)hexamethylenediamine and 4-morpholino-2,6-dichloro-1,3,5-triazine, the condensation product of 2-chloro-4,6-di(4-n-butylamino-2,2,6,6-tetramethylpiperidyl)-1,3,5-triazine and 1,2-bis(3-aminopropylamino)ethane, the condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)-pyrrolidine-2,5-dione, 3-dodecyl-1-(1,2,2,6,6-pentamethyl-4-piperidyl)-pyrrolidine-2,5-dione, 2,4-bis[N-(1-cyclohexyloxy-2,2,6,6-tetramethylpiperid-4-yl)-N-butylamino]-6-(2-hydroxyethyl)amino-1,3,5-triazine, the condensation product of 2,4-bis[N-(1-cyclohexyloxy-2,2,6,6-tetramethylpiperid-4-yl)butylamino]-6-chloro-s-triazine and N,N'-bis(3-aminopropyl)ethylenediamine.

6. Oxalic acid diamides, e.g. 4,4'-dioctyloxy-oxanilide, 2,2'-diethoxy-oxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl)oxalamide, 2-ethoxy-5-tert-butyl-2'-ethyl oxanilide and a mixture thereof with 2-ethoxy-2'-ethyl-5,4'-di-tert-butyl oxanilide and mixtures of o- and p-methoxy- and of o- and p-ethoxy-disubstituted oxanilides.

7. 2-(2-Hydroxyphenyl)-1,3,5-triazines, e.g. 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxy-propyloxy)-phenyl]-4,6-bis(2,4-dimethylphenyl)-1,3,5-triazine, 2-[2-hydroxy-4-(2-hydroxy-3-octyloxy-propyloxy)-phenyl]-4,6-bis(2,4-dimethylphenyl)-1,3,5-triazine and 2-[4-dodecyloxy/tridecyloxy-(2-hydroxypropyl)oxy-2-hydroxy-phenyl]-4,6-bis(2,4-dimethylphenyl)-1,3,5-triazine.

8. Phosphites and phosphonites, e.g. triphenyl phosphite, diphenylalkyl phosphites, phenyldialkyl phosphites, tris(nonylphenyl)phosphite, trilauryl phosphite, trioctadecyl phosphite, distearyl-pentaerythritol diphosphite, tris(2,4-di-tert-butylphenyl)phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, bis-isodecyloxy-pentaerythritol diphosphite, bis(2,4-di-tert-butyl-6-methylphenyl)pentaerythritol diphosphite, bis(2,4,6-tri-tert-butylphenyl)-pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methylphenyl)methyl phosphite and bis(2,4-di-tert-butyl-6-methylphenyl)ethyl phosphite.

Further examples of UV absorbers and light stabilizers suitable as component (d) are "Krypto-UVA", as are described, for example, in EP 180 548. It is also possible to use latent UV absorbers, as described, for example, by Hida et al in RadTech Asia 97, 1997, page 212.

In addition, additives customary in the art, such as, for example, antistatics, flow improvers and adhesion enhancers, can be used.

A large number of amines can be used as further additives (d) to accelerate photo-polymerization, e.g. triethanolamine, N-methyl-diethanolamine, p-dimethylaminobenzoic acid ethyl ester or Michler's ketone. The action of the amines can be enhanced by the addition of aromatic ketones, for example of the benzophenone type. Amines suitable for use as oxygen capture agents are, for example, substituted N,N-dialkylanilines, as described in EP 339 841. Further accelerators, co-initiators and auto-oxidisers are thiols, thioethers, disulfides and phosphines, as described e.g. in EP 438 123 and GB 2 180 358.

It is also possible to add to the compositions according to the invention chain transfer reagents customary in the art. Examples include mercaptans, amines and benzothiazole. Photopolymerization can furthermore be accelerated by the addition, as further additives (d), of photosensitizers that shift or broaden the spectral sensitivity. These include especially aromatic carbonyl compounds, e.g. benzophenone derivatives, thioxanthone derivatives, especially also isopropylthioxanthone, anthraquinone derivatives and 3-acylcoumarin derivatives, terphenyls, styrylketones, and 3-(aroylmethylene)-thiazolines, camphorquinone, and also eosin, rhodamine and erythrosine dyes.

As photosensitizers there may also come into consideration, for example, the above-mentioned amines.

Further examples of such photosensitizers are

1. Thioxanthones

Thioxanthone, 2-isopropylthioxanthone, 3-isopropylthioxanthone, 2-chlorothioxanthone, 2-dodecylthioxanthone, 1-chloro-4-propoxythioxanthone, 2,4-diethylthioxanthone, 2,4-di-methylthioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl]thioxanthone, 1-ethoxycarbonyl-3-(1-methyl-1-morpholinoethyl)-thioxanthone, 2-methyl-6-dimethoxymethyl-thioxanthone, 2-methyl-6-(1,1-dimethoxybenzyl)-thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-polyethylene glycol ester, 2-hydroxy-3-(3,4-dimethyl-9-oxo-9H-thioxanthon-2-yloxy)-N,N,N-trimethyl-1-propanaminium chloride;

2. Benzophenones

Benzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4-diethylaminobenzophenone, 4-methylbenzophenone, 3-methyl-4'-phenylbenzophenone, 2,4,6-trimethylbenzophenone, 2,4,6-trimethyl-4'-phenylbenzophenone, 4-(4-methylthiophenyl)-benzophenone, 3,3'-dimethyl-4-methoxybenzophenone, methyl 2-benzoylbenzoate, 4-(2-hydroxyethylthio)-benzophenone, 4-(4-tolylthio)

benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)-benzophenone, 4-benzoyl-N,N-dimethyl-N-[2-(1-oxo-2-propenyl)oxy]ethyl-benzenemethanaminium chloride;

3. 3-Acylcoumarins

3-Benzoylcoumarin, 3-benzoyl-7-methoxycoumarin, 3-benzoyl-5,7-di(propoxy)coumarin, 3-benzoyl-6,8-dichlorocoumarin, 3-benzoyl-6-chlorocoumarin, 3,3'-carbonyl-bis[5,7-di-(propoxy)coumarin], 3,3'-carbonyl-bis(7-methoxycoumarin), 3,3'-carbonyl-bis(7-diethylaminocoumarin), 3-isobutyroylcoumarin, 3-benzoyl-5,7-dimethoxycoumarin, 3-benzoyl-5,7-diethoxycoumarin, 3-benzoyl-5,7-dibutoxycoumarin, 3-benzoyl-5,7-di(methoxyethoxy)-coumarin, 3-benzoyl-5,7-di(allyloxy)coumarin, 3-benzoyl-7-dimethylaminocoumarin, 3-benzoyl-7-diethylaminocoumarin, 3-isobutyroyl-7-dimethylaminocoumarin, 5,7-dimethoxy-3-(1-naphthoyl)-coumarin, 5,7-dimethoxy-3-(1-naphthoyl)-coumarin, 3-benzoylbenzo[f]-coumarin, 7-diethylamino-3-thienoylcoumarin, 3-(4-cyanobenzoyl)-5,7-dimethoxycoumarin;

4. 3-(Aroylmethylene)-thiazolines

3-Methyl-2-benzoylmethylene-β-naphthothiazoline, 3-methyl-2-benzoylmethylene-benzothiazoline, 3-ethyl-2-propionylmethylene-β-naphthothiazoline;

5. Other Carbonyl Compounds

Acetophenone, 3-methoxyacetophenone, 4-phenylacetophenone, benzil, 2-acetylnaphthalene, 2-naphthaldehyde, 9,10-anthraquinone, 9-fluorenone, dibenzosuberone, xanthone, 2,5-bis(4-diethylaminobenzylidene)cyclopentanone, α-(para-dimethylaminobenzylidene)-ketones, such as 2-(4-dimethylaminobenzylidene)-indan-1-one or 3-(4-dimethylaminophenyl)-1-indan-5-yl-propenone, 3-phenylthiophthalimide, N-methyl-3,5-di(ethylthio)phthalimide.

The curing process, especially in the case of pigmented compositions (e.g. compositions pigmented with titanium dioxide), may also be assisted by the addition, as additional additive (d), of a component that forms free radicals under thermal conditions, e.g. an azo compound, such as 2,2'-azobis(4-methoxy-2,4-dimethylvaleronitrile), a triazene, diazosulfide, pentazadiene or a peroxy compound, for example a hydroperoxide or peroxycarbonate, e.g. tert-butyl hydroperoxide, as described e.g. in EP 245 639.

The compositions according to the invention may comprise as further additives (d) also a photoreducible dye, e.g. a xanthene, benzoxanthene, benzothioxanthene, thiazine, pyronine, porphyrin or acridine dye, and/or a radiation-cleavable trihalomethyl compound. Similar materials are described, for example, in EP 445 624.

Further additional additives (d) are—depending upon the intended use—fluorescent whitening agents, fillers, pigments, both white and colored pigments, colorants, antistatics, wetting agents or flow improvers.

The addition of glass microspheres or pulverised glass fibers, as described, for example, in U.S. Pat. No. 5,013,768, is suitable for the curing of thick and pigmented coatings.

The formulations may also contain colorants and/or white or colored pigments. Depending upon the intended use, both inorganic and organic pigments may be used. Such additives will be known to the person skilled in the art; some examples are titanium dioxide pigments, e.g. of the rutile or anatase type, carbon black, zinc oxide, such as zinc white, iron oxides, such as iron oxide yellow, iron oxide red, chromium yellow, chromium green, nickel titanium yellow, ultramarine blue, cobalt blue, bismuth vanadate, cadmium yellow and cadmium red. Examples of organic pigments are mono- or bis-azo pigments, and also metal complexes thereof, phthalocyanine pigments, polycyclic pigments, e.g. perylene, anthraquinone, thioindigo, quinacridone or triphenylmethane pigments, and also diketo-pyrrolo-pyrrole, isoindolinone, e.g. tetrachloroisoindolinone, isoindoline, dioxazine, benzimidazolone and quinophthalone pigments. The pigments may be used in the formulations on their own or in admixture.

Depending upon the intended use, the pigments are added to the formulations in amounts customary in the art, for example in an amount of from 0.1 to 60% by weight, 0.1 to 30% by weight or 10 to 30% by weight, based on the total mass.

The formulations may also comprise, for example, organic colorants of an extremely wide variety of classes. Examples are azo dyes, methine dyes, anthraquinone dyes and metal complex dyes. Customary concentrations are, for example, from 0.1 to 20%, especially from 1 to 5%, based on the total mass.

Depending on the formulation used, it is also possible to employ as stabilizers compounds that neutralise acids, especially amines. Suitable systems are described, for example, in JP-A 11-199610. Examples are pyridine and derivatives thereof, N-alkyl- or N,N-dialkylanilines, pyrazine derivatives, pyrrole derivatives etc.

The choice of additives is governed by the field of use in question and the properties desired for that field. The additives (d) described above are customary in the art and are accordingly used in the amounts customary in the art.

The proportion of additional additives in the formulations according to the invention is, for example, from 0.01 to 10% by weight, for example from 0.05 to 5% by weight, especially from 0.1 to 5% by weight.

The invention relates also to compositions comprising as component (a) at least one ethylenically unsaturated photopolymerizable compound dissolved or emulsified or dispersed in water.

Radiation-curable aqueous prepolymer dispersions are obtainable commercially in many variations and are to be understood as being dispersions consisting of water as the continuous phase and at least one prepolymer dispersed therein. The radiation-curable prepolymer or prepolymer mixture is dispersed in water in concentrations of from 20 to 95% by weight, especially from 30 to 70% by weight. In such compositions the sum of the percentages mentioned for water and prepolymer or prepolymer mixture will be 100 in each case, the auxiliaries and additives (e.g. emulsifiers), which will be present in varying amounts in accordance with the intended use, being in addition thereto.

The radiation-curable aqueous prepolymer dispersions are known polymer systems that comprise mono- or poly-functional ethylenically unsaturated prepolymers having an average molecular weight $M_n$ (in g/mol) of at least 400, especially of from 500 to 100 000. Pre-polymers having higher molecular weights may, however, also be suitable depending upon the intended use.

There are used, for example, polymerizable C—C double-bond-containing polyesters having a maximum acid number of 10, polymerizable C—C double-bond-containing polyethers, hydroxyl-group-containing reaction products of a polyepoxide containing at least two epoxy groups per molecule with at least one α,β-ethylenically unsaturated carboxylic acid, polyurethane (meth)acrylates, and acrylic copolymers containing α,β-ethylenically unsaturated acrylic radicals, as described in EP 12 339. Mixtures of those prepolymers may also be used.

Also suitable are the polymerizable prepolymers described in EP 33 896, which are thioether adducts having an average molecular weight $M_n$ (in g/mol) of at least 600, which likewise contain polymerizable C—C double bonds.

Further suitable aqueous polymer dispersions based on specific (meth)acrylic acid alkyl ester polymerization products are described in EP 41 125.

The radiation-curable aqueous prepolymer dispersions may also comprise, as further additives, the additional additives (d) described hereinabove, for example dispersing auxiliaries, emulsifiers, anti-oxidants, light stabilizers, colorants, pigments, fillers, e.g. talcum, gypsum, silicic acid, rutile, carbon black, zinc oxide, iron oxides, reaction accelerators, flow agents, glidants, wetting agents, thickeners, matting agents, antifoams and other adjuvants customary in surface-coating technology. Suitable dispersing auxiliaries include water-soluble high molecular weight organic compounds having polar groups, e.g. polyvinyl alcohols, polyvinylpyrrolidone and cellulose ethers. Emulsifiers that may be used are non-ionic and, where appropriate, also ionic emulsifiers.

The photoinitiators of formula I according to the invention can also be dispersed as such in aqueous solutions and added in the dispersed form to the mixtures to be cured. When blended with suitable non-ionic or, where appropriate, also ionic emulsifiers, the compounds of formula I according to the invention can be incorporated into water by mixing and, for example, grinding. Stable emulsions are obtained which can be used as such as photoinitiators, especially for aqueous photocurable mixtures as described hereinabove.

In certain cases it may be of advantage to use mixtures of two or more of the photoinitiators according to the invention. It is of course also possible to use mixtures with known photoinitiators, examples being mixtures with camphorquinone, benzophenone, benzophenone derivatives, acetophenone, acetophenone derivatives, such as α-hydroxy-cycloalkylphenyl ketones or 2-hydroxy-2-methyl-1-phenyl-propanone, dialkoxyacetophenones, α-hydroxy- or α-amino-acetophenones, such as (4-methylthiobenzoyl)-1-methyl-1-morpholinoethane, (4-morpholinobenzoyl)-1-benzyl-1-dimethylaminopropane, 4-aroyl-1,3-dioxolanes, benzoin alkyl ethers and benzil ketals, such as benzil dimethyl ketal, further phenyl glyoxalates and derivatives thereof, dimeric phenyl glyoxalates, peresters, for example benzophenonetetracarboxylic acid peresters as described, for example, in EP 126 541, monoacylphosphine oxides, such as (2,4,6-trimethylbenzoyl)phenylphosphine oxide, bisacylphosphine oxides, such as bis(2,6-dimethoxybenzoyl)(2,4,4-trimethylpent-1-yl)phosphine oxide, bis(2,4,6-trimethylbenzoyl)phenylphosphine oxide or bis(2,4,6-trimethylbenzoyl)(2,4-dipentyloxyphenyl)-phosphine oxide, trisacylphosphine oxides, halomethyltriazines, e.g. 2-[2-(4-methoxyphenyl)-vinyl]-4,6-bistrichloromethyl[1,3,5]triazine, 2-(4-methoxyphenyl)-4,6-bistrichloromethyl-[1,3,5]triazine, 2-(3,4-dimethoxyphenyl)-4,6-bistrichloromethyl[1,3,5]triazine, 2-methyl-4,6-bistrichloromethyl[1,3,5]triazine, hexaarylbisimidazole/coinitiator systems, e.g. ortho-chlorohexaphenylbisimidazole in combination with 2-mercaptobenzothiazole; ferrocenium compounds or titanocenes, such as dicyclopentadienyl bis(2,6-difluoro-3-pyrrolophenyl)titanium; or O-acyloxime ester compounds, as described, for example, in GB 2 339 571. It is furthermore possible to use borate compounds as coinitiators.

Where the photoinitiators of the invention are employed in hybrid systems (meaning in this context mixtures of systems that can be cured free-radically and cationically), there are used, in addition to the free-radical curing agents according to the invention, cationic photo-initiators, such as benzoyl peroxide (other suitable peroxides are described in U.S. Pat. No. 4,950,581, column 19, lines 17-25), aromatic sulfonium, phosphonium or iodonium salts, as described, for example, in U.S. Pat. No. 4,950,581, column 18, line 60 to column 19, line 10, or cyclopentadienylarene iron (II) complex salts, for example (η⁶-isopropylbenzene)(η⁵-cyclopentadienyl) iron (II) hexafluorophosphate or oxime-based photolatent acids, as described, for example, in GB 2 348 644, U.S. Pat. No. 4,450,598, U.S. Pat. No. 4,136,055, WO 00/10972, WO 00/26219.

The invention relates also to compositions wherein the additional photoinitiators (c) are compounds of formulae VIII, IX, X, XI or/and XII:

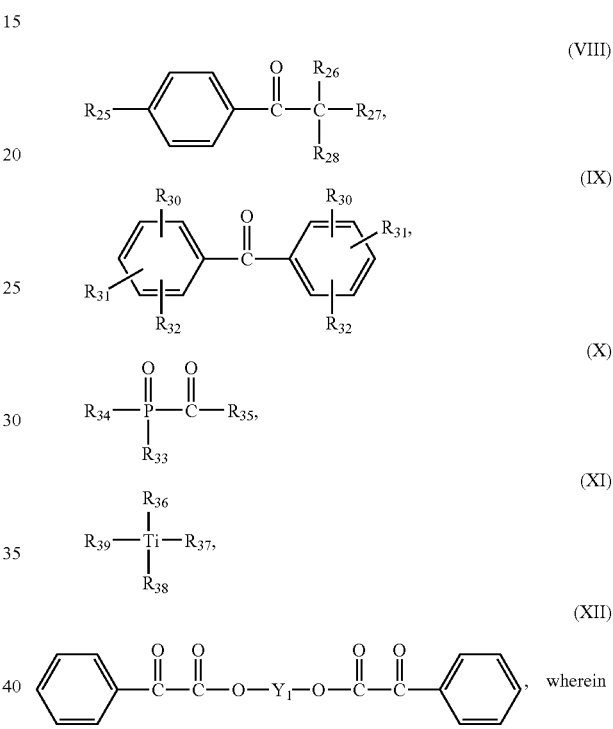

$R_{25}$ is hydrogen, $C_1$-$C_{18}$alkyl, $C_1$-$C_{18}$alkoxy, —OCH$_2$CH$_2$—OR$_{29}$, morpholino, SCH$_3$ or a group

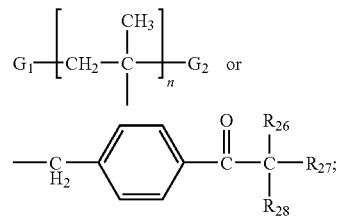

n is from 2 to 10;

$G_1$ and $G_2$ are each independently of the other terminal groups of the polymeric unit, especially hydrogen or CH$_3$;

$R_{26}$ is hydroxy, $C_1$-$C_{16}$alkoxy, morpholino, dimethylamino or —O(CH$_2$CH$_2$O)$_m$—$C_1$-$C_{16}$alkyl;

$R_{27}$ and $R_{28}$ are each independently of the other hydrogen, $C_1$-$C_6$alkyl, phenyl, benzyl, allyl, $C_1$-$C_{16}$alkoxy or —O(CH$_2$CH$_2$O)$_m$—$C_1$-$C_{16}$alkyl, or $R_{27}$ and $R_{28}$, together with the carbon atom to which they are bonded, form a cyclohexyl ring;

m is a number from 1 to 20;

wherein $R_{26}$, $R_{27}$ and $R_{28}$ are not all simultaneously $C_1$-$C_{16}$alkoxy or —O($CH_2CH_2O$)$_m$—$C_1$-$C_{16}$alkyl, and $R_{29}$ is hydrogen,

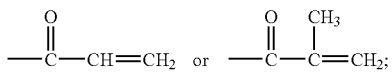

$R_{30}$ and $R_{32}$ are each independently of the other hydrogen or methyl;

$R_{31}$ is hydrogen, methyl, 2-hydroxyethylthio or phenylthio, the phenyl ring of the phenylthio radical being unsubstituted or substituted by $C_1$-$C_4$alkyl in the 4-, 2-, 2,4- or 2,4,6-position;

$R_{33}$ and $R_{34}$ are each independently of the other $C_1$-$C_{20}$alkyl, cyclohexyl, cyclopentyl, phenyl, naphthyl or biphenyl, those radicals being unsubstituted or substituted by halogen, $C_1$-$C_{12}$alkyl or/and by $C_1$-$C_{12}$alkoxy, or $R_{33}$ is an S- or N-containing 5- or 6-membered heterocyclic ring or

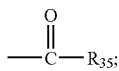

$R_{35}$ is cyclohexyl, cyclopentyl, phenyl, naphthyl or biphenyl, those radicals being unsubstituted or substituted by one or more halogen, $C_1$-$C_4$alkyl or/and $C_1$-$C_4$alkoxy substituents, or $R_{35}$ is an S- or N-containing 5- or 6-membered heterocyclic ring;

$R_{36}$ and $R_{37}$ are each independently of the other cyclopentadienyl that is unsubstituted or mono-, di- or tri-substituted by $C_1$-$C_{18}$alkyl, $C_1$-$C_{18}$alkoxy, cyclopentyl, cyclohexyl or by halogen; and $R_{38}$ and $R_{39}$ are each independently of the other phenyl, which is substituted by fluorine atoms or $CF_3$ in at least one of the two positions ortho to the titanium-carbon bond and which may contain, as further substituent on the aromatic ring, pyrrolinyl or polyoxaalkyl each of which is unsubstituted or substituted by one or two $C_1$-$C_{12}$alkyl, di($C_1$-$C_{12}$alkyl)aminomethyl, morpholinomethyl, $C_2$-$C_4$alkenyl, methoxymethyl, ethoxymethyl, trimethylsilyl, formyl, methoxy or phenyl groups, or $R_{38}$ and $R_{39}$ are

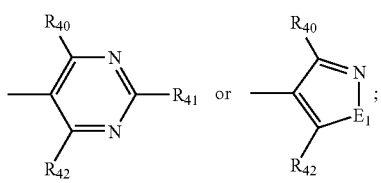

$R_{40}$, $R_{41}$ and $R_{42}$ are each independently of the others hydrogen, halogen, $C_2$-$C_{12}$alkenyl, $C_1$-$C_{12}$alkoxy, $C_2$-$C_{12}$alkoxy interrupted by from one to four oxygen atoms, cyclohexyloxy, cyclopentyloxy, phenoxy, benzyloxy, unsubstituted or $C_1$-$C_4$alkoxy-, halo-, phenylthio- or $C_1$-$C_4$alkylthio-substituted phenyl or biphenyl, wherein $R_{40}$ and $R_{42}$ are not both simultaneously hydrogen and, in the radical

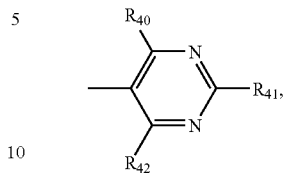

at least one radical $R_{40}$ or $R_{42}$ is $C_1$-$C_{12}$alkoxy, $C_2$-$C_{12}$alkoxy interrupted by from one to four oxygen atoms, cyclohexyloxy, cyclopentyloxy, phenoxy or benzyloxy;

$E_1$ is O, S or $NR_{43}$;

$R_{43}$ is $C_1$-$C_8$alkyl, phenyl or cyclohexyl; and $Y_1$ is $C_3$-$C_{12}$alkylene, butenylene, butynylene, or $C_4$-$C_{12}$alkylene interrupted one or more times by non-consecutive —O— or —$NR_{44}$—, or $Y_1$ is phenylene, cyclohexylene,

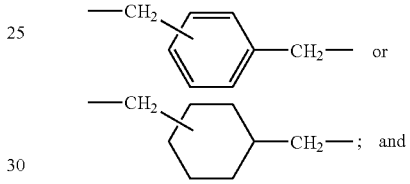

$R_{44}$ is hydrogen, $C_1$-$C_4$alkyl or $C_2$-$C_4$hydroxyalkyl.

Preference is given to compositions wherein, in compounds of formulae VII, IX, X, XI and XII, $R_{25}$ is hydrogen, —$OCH_2CH_2$—$OR_{29}$, morpholino, $SCH_3$ or a group

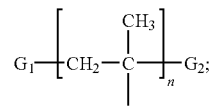

$R_{26}$ is hydroxy, $C_1$-$C_{16}$alkoxy, morpholino or dimethylamino;

$R_{27}$ and $R_{28}$ are each independently of the other $C_1$-$C_4$alkyl, allyl, phenyl, benzyl or $C_1$-$C_{16}$alkoxy, or $R_{27}$ and $R_{28}$, together with the carbon atom to which they are bonded, form a cyclohexyl ring;

$R_{29}$ is hydrogen or

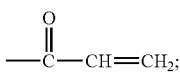

$R_{30}$, $R_{31}$ and $R_{32}$ are hydrogen;

$R_{33}$ is $C_1$-$C_{12}$alkyl, unsubstituted phenyl or phenyl substituted by $C_1$-$C_{12}$alkyl or/and by $C_1$-$C_{12}$alkoxy;

$R_{34}$ is

$R_{35}$ is phenyl, which is substituted by one or more $C_1$-$C_4$alkyl or/and $C_1$-$C_4$alkoxy substituents.

Preferred compounds of formulae VIII, IX, X, XI and XII are α-hydroxycyclohexylphenyl ketone and 2-hydroxy-2-methyl-1-phenylpropanone, phenylglyoxylic acid methyl ester, phenyl-(CO)(CO)—OCH$_2$CH$_2$OCH$_2$CH$_2$O—(CO)(CO)-phenyl, (4-methylthiobenzoyl)-1-methyl-1-morpholinoethane, (4-morpholinobenzoyl)-1-benzyl-1-dimethylaminopropane, (3,4-dimethoxybenzoyl)-1-benzyl-1-dimethylaminopropane, (4-morpholinobenzoyl)-1-(4-methylbenzyl)-1-dimethylaminopropane, benzil dimethyl ketal, (2,4,6-trimethylbenzoyl)phenylphosphine oxide, bis(2,6-dimethoxybenzoyl)-(2,4,4-trimethylpent-1-yl)phosphine oxide, bis(2,4,6-trimethylbenzoyl)phenylphosphine oxide or bis(2,4,6-trimethylbenzoyl)-(2,4-di-pentyloxyphenyl)phosphine oxide and dicyclopentadienyl-bis(2,6-difluoro-3-pyrrolo)titanium.

Preference is given furthermore to compositions wherein, in formula VIII, $R_{27}$ and $R_{28}$ are each independently of the other $C_1$-$C_6$alkyl or, together with the carbon atom to which they are bonded, form a cyclohexyl ring and $R_{26}$ is hydroxy.

The proportion of compounds of formula I (=photoinitiator component (b)) in the mixture with compounds of formulae VIII, IX, X, XI and/or XII (=photoinitiator component (c)) is from 5 to 99%, e.g. from 20 to 80%, preferably from 25 to 75%.

Of special interest are compositions as described above that comprise photoinitiator mixtures of formulae I, VIII, IX, X, XI and/or XII and are liquid at room temperature.

The preparation of the compounds of formulae VIII, IX, X, XI and XII is generally known to the person skilled in the art and some of those compounds are obtainable commercially. The preparation of oligomeric compounds of formula VIII is described, for example, in EP 161 463. A description of the preparation of compounds of formula IX may be found, for example, in EP 209 831. The preparation of compounds of formula X is disclosed, for example, in EP 7 508, EP 184 095 and GB 2 259 704. The preparation of compounds of formula XI is described, for example, in EP 318 894, EP 318 893 and EP 565 488. The preparation of compounds of formula XII is described, for example, in U.S. Pat. No. 6,048,660.

The photopolymerizable compositions contain photoinitiator advantageously in an amount of from 0.05 to 20% by weight, for example from 0.05 to 15% by weight, preferably from 0.1 to 5% by weight, based on the composition. The amount of photoinitiator indicated relates to the total amount of all photoinitiators added, when mixtures thereof are used, that is to say both to the photoinitiator (b) and to the photoinitiators (b)+(c).

The photopolymerizable compositions may be used for a variety of purposes, for example as printing ink, e.g. screen printing ink, flexographic printing ink or offset printing ink, as clearcoats, as colorcoats, as whitecoats, for example for wood or metal, as powder coatings, as paints inter alia for paper, wood, metal or plastics, as daylight-curable paints for marking structures and roads, for photographic reproduction processes, for holographic recording materials, for image-recording processes or in the production of printing plates that can be developed using organic solvents or using aqueous-alkaline media, in the production of masks for screen printing, as dental filling compounds, as adhesives, as pressure-sensitive adhesives, as laminating resins, as photoresists, for example galvanoresists, etch resists or permanent resists, both liquid and in the form of dry films, as photostructurable dielectrics, and as solder masks for electronic circuits, as resists in the manufacture of color filters for any type of display screen or in the formation of structures during the manufacture of plasma displays and electroluminescent displays, in the manufacture of optical switches, optical grids (interference grids), in the manufacture of three-dimensional articles by bulk curing (UV curing in transparent moulds) or according to the stereolithography method, as described, for example, in U.S. Pat. No. 4,575,330, in the manufacture of composite materials (e.g. styrene polyesters which may include glass fibers and/or other fibers and other adjuvants) and other thick-layered compositions, in the coating or sealing of electronic components or as coatings for optical fibers. The compositions are furthermore suitable for the manufacture of optical lenses, for example contact lenses or Fresnel lenses, and for the manufacture of medical apparatus, aids or implants.

The compositions are furthermore suitable for the preparation of gels having thermotropic properties. Such gels are described, for example, in DE 197 00 064 and EP 678 534.

The compositions may in addition be used in dry film paints, as are described, for example, in Paint & Coatings Industry, April 1997, 72 or Plastics World, Volume 54, No. 7, page 48(5).

The compounds according to the invention may also be used as initiators in emulsion polymerization, bead polymerization or suspension polymerization or as initiators of polymerization for fixing orientation states of liquid-crystalline monomers and oligomers or as initiators for fixing dyes on organic materials.

In surface coatings there are frequently used mixtures of a prepolymer with polyunsaturated monomers that in addition contain a mono-unsaturated monomer. The prepolymer in that case especially determines the properties of the surface-coating film, and by variation thereof it Is possible for the person skilled in the art to influence the properties of the cured film. The polyunsaturated monomer functions as a crosslinking agent which renders the surface-coating film insoluble. The mono-unsaturated monomer functions as a reactive diluent by means of which the viscosity is reduced without the need to use a solvent.

Unsaturated polyester resins are generally used in two-component systems together with a mono-unsaturated monomer, preferably styrene. For photoresists, specific one-component systems are often used, e.g. polymaleimides, polychalcones or polyimides, as described in DE 2 308 830.

The compounds according to the invention and mixtures thereof can furthermore be used as free-radical photoinitiators or photoinitiating systems for radiation-curable powder coatings. The powder coatings can be based on solid resins and monomers containing reactive double bonds, for example maleates, vinyl ethers, acrylates, acrylamides and mixtures thereof. A free-radically UV-curable powder coating can be formulated by mixing unsaturated polyester resins with solid acrylamides (e.g. methylacrylamidoglycolate methyl ester) and a free-radical photoinitiator according to the invention, as described, for example, in the presentation "Radiation Curing of Powder Coating", Conference Proceedings, Radtech Europe 1993 by M. Wittig and Th. Gohmann. Similarly, free-radically UV-curable powder coatings can be formulated by mixing unsaturated polyester resins with solid acrylates, methacrylates or vinyl ethers and a photoinitiator (or photoinitiator mixture) according to the invention. The powder coatings may also comprise binders, such as are described, for example, in DE 4 228 514 and EP 636 669. The UV-curable powder coatings can also comprise white or colored pigments. For example, especially rutile/titanium dioxide may be used in concentrations of up to approximately 50% by weight in order to obtain a cured powder coating having good hiding power. The process normally comprises spraying the powder electrostatically or tribostatically onto the substrate, for example metal or wood, melting the powder by heating and, after a smooth film has formed, radiation-curing the coating with ultraviolet and/or visible light, for example using medium-pressure mercury lamps, metal halide lamps or xenon lamps. A particular advantage of radiation-curable powder coatings over corresponding thermally curable coatings is that the flow time after the powder particles have been melted can be prolonged as desired in order to ensure the formation of a smooth high-gloss coating. Unlike thermally curable systems, radiation-curable powder coatings can be so formulated that they melt at relatively low temperatures without the undesired effect of their useful life being shortened. For that reason they are also suitable as coatings for heat-sensitive substrates, such as wood or plastics.

In addition to comprising the photoinitiators according to the invention, the powder coating formulations may also comprise UV absorbers. Appropriate examples are listed hereinabove under points 1 to 8.

The photocurable compositions of the invention are suitable, for example, as coating materials for substrates of all kinds, e.g. wood, textiles, paper, ceramics, glass, plastics, such as polyesters, polyethylene terephthalate, polyolefins or cellulose acetate, especially in the form of films, and also metals, such as Al, Cu, Ni, Fe, Zn, Mg or Co and GaAs, Si or $SiO_2$, to which a protective layer or, for example by imagewise exposure, an image, is to be applied.

The substrates can be coated by applying a liquid composition, a solution or a suspension to the substrate. The choice of solvent and the concentration are guided chiefly by the nature of the composition and by the coating method. The solvent should be inert, i.e. it should not enter into any chemical reaction with the components, and it should be capable of being removed again on drying after the coating operation. Suitable solvents include, for example, ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate.

The formulation is applied uniformly to a substrate by means of known coating methods, for example by spin-coating, dipping, knife coating, curtain pouring, brush application, spraying, especially by electrostatic spraying, and reverse roll coating, and also by electrophoretic deposition. It is also possible to apply the photosensitive layer to a temporary flexible support and then coat the final substrate, for example a copper-clad circuit board, by transferring the layer via lamination.

The amount applied (layer thickness) and the nature of the substrate (layer support) are dependent upon the desired field of application. The person skilled in the art will be familiar with the layer thicknesses suitable for the field of application in question, for example the photoresist field, printing ink field or paints field. The range of layer thicknesses generally includes values from about 0.1 µm to more than 10 mm, depending upon the field of application.

The radiation-sensitive compositions according to the invention are also used, for example, as negative resists that have a very high degree of photosensitivity and can be developed in an aqueous-alkaline medium without swelling. They are suitable as photoresists for electronics, such as galvanoresists, etch resists, in both liquid and dry films, as solder resists, as resists in the production of color filters for any type of display screen, or in the formation of structures during the manufacture of plasma displays and electroluminescent displays, in the production of printing plates, for example offset printing plates, in the production of printing blocks for letterpress printing, for planographic printing, for intaglio printing, flexographic printing or screen printing blocks, the production of relief copies, for example in the production of texts in braille, in the production of dies, for use in the etching of moldings or for use as microresists in the production of integrated circuits. The compositions can also be used as photostructurable dielectrics, for the encapsulation of materials or as insulator coating in the production of computer chips, printed circuits and other electrical or electronic components. The layer supports possible and the conditions for processing the coated substrates are correspondingly various.

The compounds according to the invention are also used in the production of single- or multi-layered materials for image recording or image duplication (copying, reprographics), which may be monochrome or polychrome. Such materials can in addition also be used in color-testing systems. In that technology it is also possible to use formulations comprising microcapsules, and for image creation the exposure step can be followed by a thermal step. Such systems and technologies and the application thereof are described, for example, in U.S. Pat. No. 5,376,459.

For photographic information recordings there are used, for example, foils of polyester, cellulose acetate or plastics-coated papers; for offset printing blocks, for example, specially treated aluminium, for the production of printed circuits, for example, copper-clad laminates, and for the production of integrated circuits on silicon wafers. The usual layer thicknesses for photographic materials and offset printing blocks are generally about from 0.5 µm to 10 µm, and for printed circuits from 1.0 µm to about 100 µm.

After the substrates have been coated, the solvent is generally removed by drying, resulting in a coat of the photoresist on the support.

The term "imagewise" exposure includes exposure using a photomask having a pre-determined pattern, e.g. a transparency, exposure using a laser beam which is moved over the surface of the coated substrate, for example under computer control, and in that way produces an image, and irradiation with computer-controlled electron beams. It is also possible to use masks of liquid crystals, which can be controlled pixel by pixel to produce digital images, as described, for example, by A. Bertsch, J. Y. Jezequel, J. C. Andre in Journal of Photochemistry and Photobiology A: Chemistry 1997, 107, p. 275-281 and by K.-P. Nicolay in Offset Printing 1997, 6, p. 34-37.

Conjugated polymers, for example polyanilines, can be converted from a semi-conductive state to a conductive state by doping with protons. The photoinitiators according to the invention can also be used for the imagewise exposure of polymerizable compositions comprising such polymers in order to form conductive structures (in the irradiated zones), which are embedded in insulating material (unexposed zones). Such materials can be used, for example, as wiring components or connection components in the production of electrical or electronic parts.

After the imagewise exposure of the material and prior to development it may be advantageous to carry out a thermal treatment for a relatively short time. During the thermal treatment only the exposed areas are thermally cured. The temperatures used are generally from 50 to 150° C., preferably from 80 to 130° C.; the duration of the thermal treatment is generally from 0.25 to 10 minutes.

The photocurable composition may also be used in a method of producing printing blocks or photoresists, as described e.g. in DE 4 013 358. In such a method, before, at the same time as or after the imagewise irradiation the composition is exposed briefly to visible light of a wavelength of at least 400 nm without a mask. After exposure and optional thermal treatment, the unexposed areas of the photosensitive coating are removed in a manner known per se using a developer.

As already mentioned, the compositions according to the invention can be developed in an aqueous-alkaline medium. Suitable aqueous-alkaline developer solutions are especially aqueous solutions of tetraalkylammonium hydroxides or of alkali metal silicates, phosphates, hydroxides or carbonates. If desired, in addition relatively small amounts of wetting agents and/or organic solvents may be added to those solutions. Typical organic solvents that may be added in small amounts to the developer fluids are, for example, cyclohexanone, 2-ethoxyethanol, toluene, acetone and mixtures of such solvents.

Photocuring is of great importance for printing inks, since the drying time of the binder is a determining factor for the rate of production of graphic products and should be of the order of fractions of a second. UV-curable inks are important especially for screen printing, flexographic printing and offset printing.

As already mentioned above, the mixtures according to the invention are also very suitable for the production of printing plates. For that application there are used, for example, mixtures of soluble linear polyamides or styrene/butadiene or styrene/isoprene rubber, polyacrylates or polymethyl methacrylates having carboxyl groups, polyvinyl alcohols or urethane acrylates with photopolymerizable monomers, for example acrylic or methacrylic amides or acrylic or methacrylic esters, and a photoinitiator. Films and plates made from those systems (wet or dry) are exposed through the negative (or positive) of the original and the uncured portions are then eluted with a suitable solvent.

Another field of use for photocuring is metal coating, for example in the application of a finish to sheets and tubes, cans or bottle closures, as well as photocuring on plastics coatings, for example of PVC-based floor or wall coverings. Examples of the photocuring of paper coatings include the application of a colorless finish to labels, record sleeves or book covers.

Also of interest is the use of the compounds of the invention in the curing of mouldings made of composite materials. The composite material consists of a self-supporting matrix material, for example woven glass fibers, or alternatively, for example, plant fibers [see K.-P. Mieck, T. Reussmann in Kunststoffe 85 (1995), 366-370], which is impregnated with the photocuring formulation. Mouldings made of composite materials that have been produced using the compounds according to the invention have a high degree of mechanical stability and resistance. The compounds according to the invention can also be used as photocuring agents in moulding, impregnating and coating materials, as described, for example, in EP 7086. Such materials are, for example, thin-layer resins, on which high demands are made in terms of curing activity and resistance to yellowing, and fiber-reinforced moulding materials, such as planar or longitudinally or transversely corrugated light panels. Processes for the production of such moulding materials, such as, for example, manual lay-up processes, fiber-spraying, spinning or winding processes, are described, for example, by P. H. Selden in "Glasfaserverstärkte Kunststoffe", page 610, Springer Verlag Berlin-Heidelberg-New York 1967. Articles that can be produced, for example, according to that process are boats, chipboard or plywood panels coated on both sides with glass-fiber-reinforced plastics, pipes, sports equipment, roof coverings, containers etc. Further examples of moulding, impregnating and coating materials are UP resin thin layers for glass-fiber-containing moulding materials (GRP), for example corrugated panels and paper laminates. Paper laminates may be based on urea or melamine resins. The thin layer is produced on a support (for example a film) prior to production of the laminate. The photocurable compositions according to the invention may also be used for casting resins or for the potting of articles, for example electronic components etc. In addition, they may also be used for lining cavities and pipes. For curing, medium pressure mercury lamps are used, as are customary in UV curing, but less intense lamps, for example of the TL 40W/03 or TL40W/05 type, are also of particular interest. The intensity of those lamps roughly corresponds to that of sunlight. Direct sunlight can also be used for curing. A further advantage is that the composite material can be removed from the light source in a partially cured, plastic state and subjected to shaping, after which the full cure is effected.

The photoinitiators according to present invention are also suitable for use in compositions as coatings for optical fibers. In general, optical fibers are coated with protective coats directly after their production. The fiber of glass is drawn and then one or more coatings are applied to the glass string. Usually, one, two or three coats are applied, the top coating, for example, is colored ("ink layer or ink coating"). Further, several thus coated optical fibers may be put together to a bundle and be coated all together, i.e. cabling of the fibers. The compositions according to the present invention in general are suitable for any of these coatings, which have to exhibit good softness over a broad temperature range, good tensile strength and toughness and rapid UV-curing characteristics.

Each of the coats, inner primary (usually a soft coating), outer primary or secondary (usually a harder coating than the inner coating), tertiary or the cabling coat, may comprise at least one radiation-curable oligomer, at least one radiation curable monomer diluent, at least one photoinitiator, and additives.

In general all radiation curable oligomers are suitable. Preferred are oligomers with a molecular weight of at least 500, for example 500-10 000, 700-10 000, 1000-8000 or 1000-7000, in particular urethane oligomers, containing at least one unsaturated group. Preferably the radiation curable oligomer has two terminal functional groups. The coat may contain not only one specific oligomer, but also mixtures of different oligomers. The preparation of suitable oligomers is known to the person skilled in the art and for example published in U.S. Pat. No. 6,136,880, incorporated herein by reference. The oligomers are, for example, prepared by reacting an oligomer diol, preferably a diol having 2-10 polyoxaalkylene groups, with a diisocyanate or a polyisocyanate and a hydroxy-functional ethylenically unsaturated monomer, e.g. hydroxyalkyl (meth)acrylate. Specific examples of each of the components named above, as well as suitable ratios of these components are given in U.S. Pat. No. 6,136,880, incorporated herein by reference.

The radiation curable monomer can be used in a manner to control the viscosity of the coating formulation. Accordingly, a low viscosity monomer with at least one functional group capable of photoinitiated polymerization is employed. The amount for example is chosen to adjust the viscosity in a range from 1000 to 10 000 mPa, i.e. usually for example from 10-90, or 10-80% by weight are used. The functional group of the monomer diluent preferably is of the same kind as that of the oligomer component, for example an acrylate or vinyl ether function and a higher alkyl or polyether moiety. Examples of monomer diluents suitable for coating compositions for optical fibers are published in U.S. Pat. No. 6,136,880, col. 12, line 11ff., incorporated herein by reference.

In primary coatings preferably monomers having an acrylate or vinyl ether functionality and a polyether moiety of 4 to 20 C atoms are used. Specific examples are given in the US patent incorporated by reference and cited above.

The composition may also comprise a poly(siloxane) as described in U.S. Pat. No. 5,595,820 to improve the adhesive properties of the formulation on the optical fiber glass substrate.

The coating composition usually also comprises further additives, e.g. antioxidants, light stabilizers, UV absorbers such as for example given in the list above, in particular ™IRGANOX 1035, 1010, 1076, 1222, ™TINUVIN P, 234, 320, 326, 327, 328, 329, 213, 292, 144, 622LD (all provided by Ciba Specialty Chemicals), ™ANTIGENE P, 3C, FR, GA-80, ™SUMISORB TM-061 (provided by Sumitomo Chemical Industries Co.), ™SEESORB 102, 103, 501, 202, 712, 704 (provided by Sypro Chemical Co., Ltd.), ™SANOL LS770 (provided by Sankyo Co. Ltd.) to prevent coloring of the coat, in particular during processing, and to improve the stability of the cured coat. Particularly interesting are stabilizer combinations of hindered piperidine derivatives (HALS) and hindered phenol compounds, e.g. a combination of IRGANOX 1035 and TINUVIN 292, for example in a ratio of 1:1. Further, additives are for example wetting agents and other additives having an effect on the rheology properties of the coating. Also amines, for example diethylamine, can be added.

Other examples for additives for compositions for the coating of optical fibers are silane coupling agents, e.g. γ-aminopropyltriethoxysilane, γ-mercaptopropyltrimethoxysilane, γ-methacryloxypropyl-trimethoxysilane, SH6062, SH6030 (provided by Toray-Dow Corning Silcone Co., Ltd.), KBE 903, KBE 603, KBE 403 (provided by Shin-Etsu Chemical Co., Ltd.) In order to prevent coloring of the coatings the compositions may also comprise fluorescent additives or optical brighteners, as, for example, ™UVITEX OB, provided by Ciba Specialty Chemicals.

The photoinitiators according to the present application in coating compositions for optical fibers can be admixed with one or more other known photoinitiators.

In particular with mono- or bisacylphosphinoxides as for example diphenyl-2,4,6-trimethylbenzoylphosphine oxide, bis(2,4,6-trimethylbenzoyl)-phenylphosphine oxide (®IRGA-CURE 819), bis(2,6-dimethoxybenzoyl)-2,4,4-trimethylpentylphosphine oxide; α-hydroxyketones, as for example 1-hydroxycyclohexylphenylketone (®IRGACURE 184), 2-hydroxy-2-methyl-1-phenyl-1-propanone (®DAROCUR 1173), 2-hydroxy-1-[4-(2-hydroxyethoxy) phenyl]-2-methyl-1-propanone (®IRGACURE 2959); α-aminoketones, as for example 2-methyl-1-[4-(methylthio) phenyl]-2-(4-morpholinyl)-1-propanone (®IRGACURE 907), 2-benzyl-2-(dimethylamino)-1-[4-(4-morpholinyl) phenyl]-1-butanone ®IRGACURE 369), 2-(4-methylbenzyl-2-(dimethylamino)-1-[4-(4-morpholinyl)phenyl]-1-butanone, 2-benzyl-2-(dimethylamino)-1-[3,4-dimethoxyphenyl]-1-butanone; benzophenones such as for example benzophenone, 2,4,6-trimethylbenzophenone, 4-methylbenzophenone, 2-methylbenzophenone, 2-methoxycarbonylbenzophenone, 4,4'-bis(chloromethyl)benzophenone, 4-chlorobenzophenone, 4-phenylbenzophenone, 4,4'-bis(dimethylamino)benzophenone, 4,4'-bis(diethylamino)benzophenone, methyl 2-benzoyl benzoate, 3,3'-dimethyl-4-methoxybenzophenone, 4-(4-methylphenylthio)benzophenone, 2,4,6-trimethyl-4'-phenyl-benzophenone, 3-methyl-4'-phenyl-benzophenone and also ketal compounds, for example 2,2-dimethoxy-1,2-diphenyl-ethanone (®IRGACURE 651); monomeric or dimeric phenylglyoxylic acid esters, such as for example methylphenylglyoxylic acid ester, 5,5'-oxo-di(ethyleneoxydicarbonylphenyl) or 1,2-(benzoylcarboxy)ethane. In particular suitable are mixtures with mono- or bis-acylphosphine oxides and/or α-hydroxyketones.

It is evident that the formulations, in order to enhance the properties of the photoinitiators, may also comprise sensitizer compounds, for example amines.

The coatings are either applied "wet on dry" or "wet on wet". In the first case after the application of the primary coat a curing step by irradiation with UV light is carried out prior to the application of the second coat. In the second case both coatings are applied and cured together by irradiation with UV light.

The curing with UV irradiation in this application usually takes place in a nitrogen atmosphere. In general all radiation sources usually employed in the photocuring technique can be used for the curing of optical fiber coatings. These are, for example the radiation sources listed below. Generally, medium pressure mercury lamps or/and Fusion D lamps are used. Also flash lamps are suitable. It is evident that the emission of the lamps is matched with the absorption of the photoinitiator or photoinitiator mixture which is used. The optical fiber coating compositions may also be cured by irradiation with an electron beam, in particular with low power electron beams, as is, for example disclosed in WO 98/41484.

In order to distinguish different fibers in an assembly, the fibers may be covered with a third colored coating ("ink coating"). The compositions used for this coating in addition to the polymerizable components and the photoinitiator comprise a pigment or dye. Examples for pigments suitable for optical fiber coatings are inorganic pigments, such as for example titanium dioxide, zinc oxide, zinc sulfide, barium sulfate, aluminium silicate, calcium silicate, carbon black, black iron oxide, copper chromite black, iron oxides, chromium oxide greens, iron blue, chrome green, violet (e.g. manganese violet, cobalt phosphate, $CoLiPO_4$), lead chromates, lead molybdates, cadmium titanate and pearlescent and metallic pigments, as well as organic pigments, such as monoazo pigments, diazo pigments, diazo condensation pigments, quinacridone pigments, dioxazine violet, vat pigments, perylene pigments, thioindigo pigments, phthalocyanine pigments and tetrachloroisoindolinones. Examples for suitable pigments are carbon black for a black coating, titanium dioxide for a white coating, diarylide yellow or diazo based pigments for yellow coatings, phthalocyanine blue, and other phthalocyanines, for blue coatings, anthraquinone red, naphthol red, monazo based pigments, quinacridone pigments, anthraquinone and perylenes for red coatings, phthalocyanine green and nitroso based pigments for green coatings, monazo and diazo based pigments, quinacridone pigments, anthraquinones and perylenes for orange coatings, and quinacridone violet, basic dye pigments and carbazole dioxazine based pigments for violet coatings. The person skilled in the art is well aware of formulating and combining suitable further pigments if even more colored coatings, such as aqua, brown, gray, pink etc. are needed. The mean particle size of the pigments usually is about 1 μm or less. The size of commercial pigments can be reduced by milling, if necessary. The pigments for example, can be added to the formulation in the form of a dispersion in order to simplify the mixing with the other ingredients of the formulation. The pigments are, for example, dispersed in a low viscosity liquid, e.g. a reactive diluent. Preferred is the use of organic pigments. Suitable amounts for pigment in the ink coating are for example 1-20, 1-15, preferably 1-10% by weight.

The ink coating in general also comprises a lubricant to provide improved break-out properties of the single coated optical fiber from the matrix. Examples of such lubricants are silicones, fluorocarbon oils or resins and the like, preferably a silicone oil or a functionalized silicone compound, e.g. silicone diacrylate is used.

The compositions according to the present invention are further suitable as a matrix material for an assembly of coated optical fibers. That is, several of the primary, secondary (and in some cases tertiary) coated fibers, for example, in the third coat being differentiated by different colors, are assembled in a matrix.

The coating of an assembly preferably besides the additives given above also contains a release agent to allow for easy access to the individual fibers during the installation of the optical fiber cables. I.e.

Examples of such release agents are teflon, silicones, silicon acrylates, fluorocarbon oils or resins and the like. The release agents suitably are added in an amount of 0.5-20% by weight. Examples of ink coatings and matrix materials for coated optical fibers are given in U.S. Pat. Nos. 6,197,422, 6,130,980 and EP 614099, incorporated herein by reference The compositions and compounds according to the invention can also be used in the manufacture of optical waveguides and optical switches, making use of the generation of a difference in the refractive index between exposed and unexposed areas.

The use of photocurable compositions for imaging processes and for the optical production of information carriers is also important. For that application, as already described above, the layer (wet or dry) applied to the support is irradiated using a photomask with UV or visible light and the unexposed areas of the layer are removed by treatment with a solvent (=developer). The photocurable layer can also be applied to metal in an electrodeposition process. The exposed areas are crosslinked polymers and are therefore insoluble and remain on the support. When suitably colored, visible images are formed. When the carrier is a metallised layer, after exposure and developing it is possible for the metal to be etched away in the unexposed areas or strengthened by galvanisation. In that way it is possible to produce printed electronic circuits and photoresists.

The photosensitivity of the compositions according to the invention usually extends from approximately 200 nm to approximately 600 nm (UV field). Suitable radiation is present, for example, in sunlight or light from artificial light sources. Accordingly a large number of the most varied kinds of light source may be used. Both point sources and planiform radiators (lamp arrays) are suitable. Examples are: carbon arc lamps, xenon arc lamps, medium pressure, high pressure and low pressure mercury arc radiators, doped, where appropriate, with metal halides (metal halide lamps), microwave-excited metal vapour lamps, excimer lamps, superactinic fluorescent tubes, fluorescent lamps, argon incandescent lamps, electronic flash lamps, photographic floodlight lamps, light-emitting diodes (LED), electron beams and X-rays. The distance between the lamp and the substrate according to the invention to be exposed may vary according to the intended use and the type and strength of the lamp and may be, for example, from 2 cm to 150 cm. Especially suitable are laser light sources, for example excimer lasers, such as Krypton-F lasers for example for exposure at 248 nm. Lasers in the visible range may also be used. It is possible to produce printed circuits in the electronics industry, lithographic offset printing plates or relief printing plates and also photographic image-recording materials using that method.

The invention accordingly relates also to a process for photopolymerizing non-volatile monomeric, oligomeric or polymeric compounds containing at least one ethylenically unsaturated double bond, which process comprises irradiating a composition as described above with light in a range from 200 to 600 nm. The invention relates also to the use of compounds of formula I as photoinitiators in the photopolymerization of non-volatile monomeric, oligomeric or polymeric compounds containing at least one ethylenically unsaturated double bond by irradiation with light in the range from 200 to 600 nm.

The invention relates also to the use of the above-described composition and to a process for the preparation of pigmented and unpigmented surface-coatings, printing inks, for example screen printing inks, offset printing inks, flexographic printing inks, powder coatings, printing plates, adhesives, dental compositions, optical waveguides, optical switches, color test systems, composite materials, glass fiber cable coatings, screen printing stencils, resist materials, color filters, the use in the encapsulation of electrical and electronic components, in the production of magnetic recording materials, in the production of three-dimensional objects by means of stereolithography, for photographic reproductions, and the use as image-recording material, especially for holographic recordings, for decolorising materials, for decolorising materials for image-recording materials, for image-recording materials using microcapsules.

The invention relates also to a coated substrate that is coated on at least one surface with a composition as described above, and to a method for the photographic production of relief images, wherein a coated substrate is exposed imagewise and then the unexposed portions are removed using a solvent. The imagewise exposure can be carried out using a mask or using a laser beam. Exposure using a laser beam is of special interest.

Not only do the compounds according to the invention have a photoinitiating action, but they are also capable, by virtue of their special substituents, of being incorporated and anchored in the formulations to be polymerized, that is to say they are capable of reacting with any desired constituents of those formulations, irrespective of whether or not those constituents then take part in the photopolymerization reaction, and as a result they are firmly bound in the resulting polymer structure.

Compounds of formula I according to the invention wherein $R_1$ is OH, in addition to having the above-described property, exhibit a further important property in that they are important intermediates in the preparation of compounds of formula I that are further functionalised.

The Examples which follow illustrate the invention further. As in the remainder of the description and in the patent claims, parts and percentages are by weight unless indicated otherwise. References to alkyl or alkoxy radicals containing more than three carbon atoms without indication of the form of isomer thereof should be understood in each case as referring to the respective n-isomer.

EXAMPLE 1

Preparation of

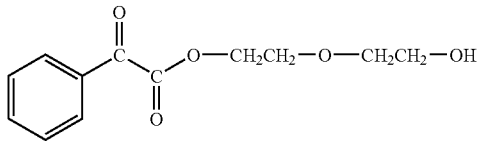

137.9 g of phenylglyoxylic acid methyl ester, 891.7 g of diethylene glycol and 2.2 g of lithium acetate dihydrate are placed as the initial charge, at room temperature, in a 1.5 litre multi-necked flask equipped with a distillation device. With stirring, the reaction vessel is slowly evacuated to from 8 to 10 mbar. The reaction mixture is then heated to from 50 to 60° C. After about 72 hours, all of the methanol that has formed has been removed by distillation and the reaction is complete. The reaction mixture is poured together with 500 ml of water into a separating funnel and extracted three times with 100 ml of toluene and then five times with 500 ml of diethyl ether. The ethereal phases are combined, dried over sodium sulfate and filtered. The product is obtained after distilling off the solvent (using a rotary evaporator). The structure and composition are confirmed by NMR spectroscopy and HPLC (high pressure liquid chromatography).

EXAMPLE 2

Preparation of

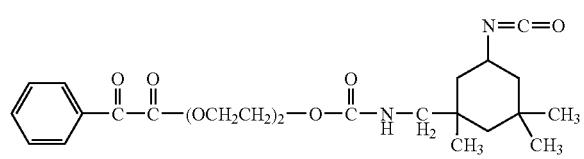

Phenylglyoxylic acid 2-[2-(5-isocyanato-1,3,3-trimethylcyclohexylmethyl-carbamoyloxy)-ethoxy]-ethyl ester Under argon gas, 4.28 g of the phenylglyoxylic acid (2-hydroxyethoxy)ethyl ester from Example 1 and 3.99 g of 5-isocyanato-1-isocyanatomethyl-1,1,3-trimethylcyclohexane (isophorone diisocyanate, Fluka) in 15 g of toluene are placed as the initial charge in a 50 ml multi-necked flask and refluxed at 110° C. After 18 hours, the solution is cooled and the toluene is concentrated using a rotary evaporator. The residue is dried under a high vacuum for two hours. 8.2 g of a viscous, yellowish oil are obtained. The conversion and the composition of the product are verified by $^1$H-NMR spectrum and IR spectrum (NCO bands).

Elemental Analysis:

| $C_{24}H_{32}N_2O_7$ | %C [calc./found] | %H [calc./found] | %N [calc./found] |
|---|---|---|---|
| | 62.59/63.55 | 7.00/7.07 | 6.08/6.07 |

EXAMPLE 3

Preparation of

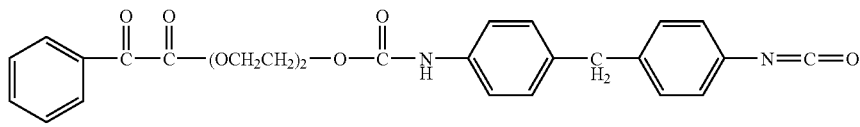

Phenylglyoxylic acid 2-{2-[4-(4-isocyanatobenzyl)-phenylcarbamoyloxy]-ethoxy}-ethyl ester Under argon gas, 2.14 g of the phenylglyoxylic acid (2-hydroxyethoxy)ethyl ester from Example 1 and 2.24 g of 4,4'-diphenylmethane diisocyanate (Desmodur VL, Bayer) in 15 g of toluene are placed as the initial charge in a 50 ml multi-necked flask and refluxed at 110° C. After 19 hours, the solution is cooled and the toluene is concentrated using a rotary evaporator. The residue is dried under a high vacuum for two hours. 4.6 g of a viscous, slightly brownish oil are obtained. The conversion and the composition of the product mixture are verified by $^1$H-NMR spectrum and IR spectrum (NCO bands).

Elemental Analysis:

| $C_{27}H_{24}N_2O_7$ | | |
|---|---|---|
| % C [calc./found] | % H [calc./found] | % N [calc./found] |
| 66.39/67.54 | 4.95/5.19 | 5.73/5.52 |

EXAMPLE 4

Preparation of

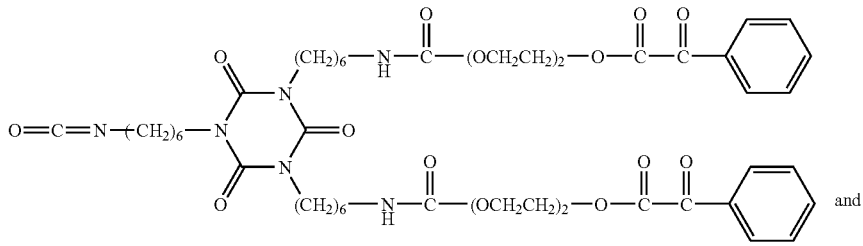

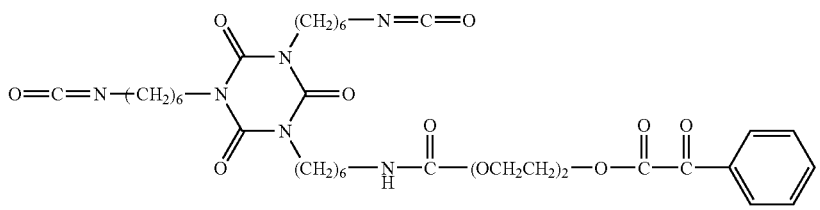

Phenylglyoxylic acid 2-(2-{6-[3-(6-isocyanato-hexyl)-2,4,6-trioxo-5-(6-{2-[2-(2-oxo-2-phenylac-etoxy)-ethoxy]-ethoxycarbonylamino}-hexyl)-[1,3,5]triazinan-1-yl]-hexylcarbamoyloxy}-ethoxy)ethyl ester and phenylglyoxylic acid 2-(2-{6-[3,5-bis(6-isocyanatohexyl)-2,4,6-trioxo-1,3,5]triazinan-1-yl]-hexylcarbamoyloxy}-ethoxy)ethyl ester Under argon gas, 2.14 g of the phenylglyoxylic acid (2-hydroxyethoxy)ethyl ester from Example 1 and 3.02 g of 1,3,5-tris(6-isocyanatohexyl)-[1,3,5]triazinane-2,4,6-trione (Desmodur N 3300, Bayer) in 15 g toluene are placed as the initial charge in a 50 ml multi-necked flask and refluxed at 110° C. After 16 hours, the solution is cooled and the toluene is concentrated using a rotary evaporator. The residue is dried under a high vacuum for 3 hours. 5.3 g of a viscous, colorless oil are obtained. The conversion and the composition of the product mixture are verified by $^1$H-NMR spectrum and IR spectrum (NCO bands). As regards the photoinitiator, the monoproduct and the bisproduct are present in equal proportions.

Elemental Analysis:

| $C_{48}H_{64}N_8O_{16}$ and $C_{36}H_{50}N_6O_{11}$ | | |
|---|---|---|
| % C [calc./found] | % H [calc./found] | % N [calc./found] |
| 58.53/58.42 | 6.67/6.71 | 9.75/9.18 |

EXAMPLE 5

Preparation of

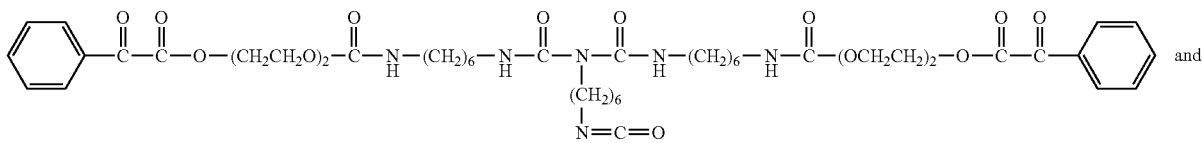

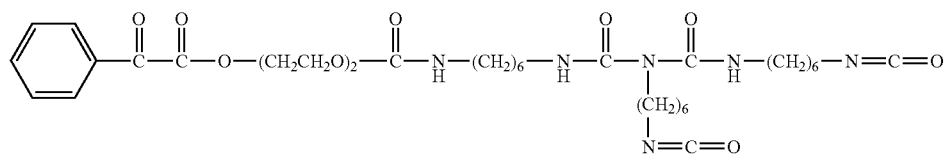

1,3-bis(6-{2-[2-(2-oxo-2-phenylacetoxy)-ethoxy]-ethoxycarbonylamino}-hexyl)-5-(6-isocyanatohexyl)biuret and 1-(6-{2-[2-(2-oxo-2-phenylacetoxy)-ethoxy]-ethoxycarbonylamino}-hexyl)-3,5-bis(6-isocyanatohexyl)biuret Under argon gas, 2.14 g of the phenylglyoxylic acid (2-hydroxyethoxy)ethyl ester from Example 1 and 2.86 g of 1,3,5-tris(6-isocyanatohexyl)biuret (Desmodur N 3200, Bayer) in 15 g toluene are placed as the initial charge in a 50 ml multi-necked flask and refluxed at 110° C. After 19 hours, the solution is cooled and the toluene is concentrated using a rotary evaporator. The residue is dried under a high vacuum. 4.8 g of a viscous, colorless oil are obtained. The conversion and the composition of the product mixture are verified by $^1$H-NMR spectrum and IR spectrum (NCO bands). As regards the photoinitiator, the monoproduct and the bisproduct are present in equal proportions.

Elemental Analysis:

| $C_{47}H_{66}N_6O_{15}$ and $C_{35}H_{52}N_6O_{10}$ | | |
|---|---|---|
| % C [calc./found] | % H [calc./found] | % N [calc./found] |
| 58.91/59.22 | 7.11/7.14 | 10.05/9.67 |

EXAMPLE 6

Preparation of

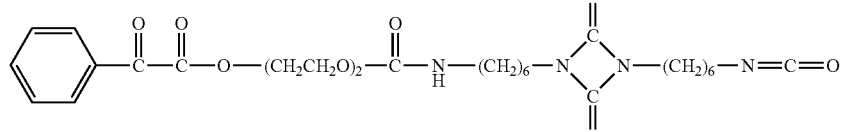

Phenylglyoxylic acid 2-(2-(6-[3-(6-isocyanatohexyl)-2,4-dioxo-[1,3]diazetidin-1-yl]-hexylcarbamoyloxy)-ethoxy)ethyl ester Under argon gas, 2.14 g of the phenylglyoxylic acid (2-hydroxyethoxy)ethyl ester from Example 1 and 3.02 g of 1,3-bis(6-isocyanatohexyl)-[1-3]diazetidine-2,4-dione (Desmodur N 3400, Bayer) in 15 g toluene are placed as the initial charge in a 50 ml multi-necked flask and refluxed at 110° C. After 19 hours, the solution is cooled and the toluene is concentrated using a rotary evaporator. The residue is dried under a high vacuum. 5.2 g of a highly viscous, colorless oil are obtained. The conversion and the composition of the product mixture are verified by $^1$H-NMR spectrum and IR spectrum (NCO bands).

Elemental Analysis:

| $C_{28}H_{38}N_4O_9$ | | |
|---|---|---|
| % C [calc./found] | % H [calc./found] | % N [calc./found] |
| 58.53/58.57 | 6.67/6.95 | 9.75/9.63 |

EXAMPLE 7

Preparation of

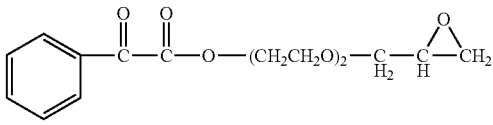

Phenylglyoxylic acid (2-oxiranylmethoxy-ethoxy)

7.1

Preparation of diethylene glycol monoglycidyl ether

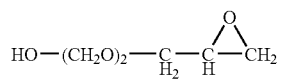

Under a nitrogen atmosphere, 26.53 g of diethylene glycol, 0.25 g of lanthanum perchlorate hexahydrate and 50 ml of toluene are placed as the initial charge in a 350 ml sulfonating flask equipped with an intensive condenser and a propeller stirrer and heated to 105° C. After reaching an internal temperature of 105° C., with the temperature remaining constant 21.3 g of epichlorohydrin are added dropwise in the course of 70 minutes. After subsequently stirring for 14 hours at 105° C., 30 ml of toluene are added to the reaction mixture, in order then to remove by azeotropic distillation any water still present. At normal pressure about 30 ml of azeotrope are distilled off. After cooling to from 48 to 50° C., about 19 g of diazobicycloundecene are added dropwise in the course of 30 minutes and the mixture is subsequently stirred for 2 hours. After cooling to room temperature, the lower phase of the two-phase reaction mixture is adjusted to pH 5 to 8 using acetic acid, diluted with methylene chloride and extracted 3 times with approximately 100 ml of brine each time. After drying with magnesium sulfate, the crude product so obtained is concentrated to dryness and 27.1 g (73% of theory) of a slightly yellowish, viscous oil are obtained. 12 g of the crude product are purified by means of flash chromatography (800 g of silica gel 60 F; ethyl acetate 95: methanol 5). The desired product is obtained in the form of a slightly yellowish oil of approximately 85% purity (determined by GC). According to $^1$H-NMR spectrum, the by-product (15%, determined by GC) is the following compound:

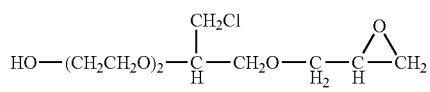

$^1$H-NMR spectrum of the diethylene glycol monoglycidyl ether (in CDCl$_3$, in ppm relative to trimethylsilane [TMS] as standard):

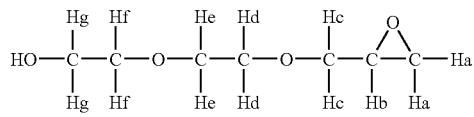

2.61-2.63 and 2.79-2.83 (2 m, Ha); 3.16-3.18 (m, Hb); 3.38-3.44 and 3.81-3.86 (2 dxd, Hz); 3.60-3.75 (m, Hd, He, Hf, Hg)

$^{13}$C-NMR spectrum of the diethylene glycol monoglycidyl ether (in CDCl$_3$, in ppm relative to TMS as standard): 44.2; 50.8; 61.6; 70.4; 70.7; 72.0; 72.6

7.2

Preparation of phenylglyoxylic acid (2-oxiranylmethoxy-ethoxy)

217 mg of phenylglyoxylic acid methyl ester, 195 mg of the diethylene glycol monoglycidyl ether obtained according to Example 7.1 and 10 mg of lithium acetate are placed as the initial charge in a pear-shaped flask. The flask is rotated in a rotary evaporator at a bath temperature of 60° C. and a reduced pressure of 150 mbar. After two hours, the bath temperature is increased to 70° C. and the pressure is reduced to 100 mbar. After a further 2 hours, the reaction solution is chromatographed on silica gel 60F using hexane:ethyl acetate 1:1. The title compound is obtained in the form of a slightly yellowish oil.

$^1$H-NMR spectrum of phenylglyoxylic acid (2-oxiranyl-methoxy-ethoxy) (in CDCl$_3$, in ppm relative to TMS as standard):

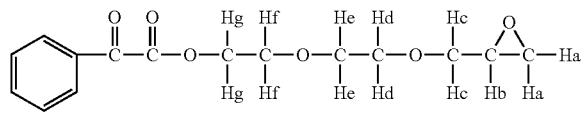

2.58-2.60 and 2.76-2.79 (2 m, Ha); 3.14-3.16 (m, Hb); 3.38-3.44 and 3.78-3.79 (2 dxd, Hc); 3.69-3.71 and 3.82-3.86 (2 m, Hd, He, Hf); 4.55-4.58 (m, Hg); 7.49-7.55 and 7.64-7.69 and 8.02-8.05 (5 aromatic H).

$^{13}$C-NMR spectrum of the diethylene glycol monoglycidyl ether (in CDCl$_3$, in ppm relative to TMS as standard): 44.2; 50.8, 64.9, 68.7, 70.6, 70.7, 72.0, 128.9, 130.1, 132.5, 135.0, 163.8, 186.2.

EXAMPLE 8

A photocurable formulation is prepared by mixing the following components:

89.0 parts epoxyacrylate (80% in hexanediol diacrylate; Ebecry® 604)

10.0 parts polyethylene glycol 400 diacrylate (Sartomer® SR 344)

1.0 part flow improver (Ebecryl® 350)

2% of the compound from Example 1 are added to the resulting formulation. The formulation is applied to an aluminium sheet with a 6 μm knife and is irradiated using 2 medium pressure mercury lamps (80 W/cm). A cured layer is obtained.

EXAMPLES 9-14

The following formulations are prepared for Examples 9 to 14:

—Component A 11.38 parts hydroxyl-group-containing polyacrylate, 70% in butyl acetate (Desmophen A 870; Bayer AG)

21.23 parts polyester polyol, 75% in butyl acetate (Desmophen VP LS 2089; Bayer AG)

0.55 part flow improver (Byk 306; Byk Chemie)

32.03 parts methanol

—Component B (The Amounts Used are Given in Table 1)

isocyanate-group-containing urethane acrylate (Roskydal UA VP LS 2337, Bayer AG)

The initiators to be tested are incorporated into component A in the concentration indicated in Table 1, with stirring. Component B is then added and homogeneously distributed.

The samples so prepared are applied to glass plates with a 250 μm slotted knife. The solvent is then flashed off at room temperature. After flash-off, a UV spectrum is recorded (UV/VIS spectrometer Perkin Elmer Lambda 900). The plates are then placed for 10 minutes on a hot plate having a temperature of 120° C. in order to start the thermal crosslinking process. A further UV spectrum of the sample is then recorded. The samples are then UV-cured at a belt speed of 5 m/min using 2×120 W/cm medium pressure mercury lamps.

The absorption of the samples after flash-off corresponds to 100%. The difference between the two spectra after flash-off and after thermal crosslinking corresponds to the percentage loss of photoinitiator as a result of volatility or through lack of incorporation. The results can be seen in Table 1.

TABLE 1

|  | Example | | | | | |
| --- | --- | --- | --- | --- | --- | --- |
|  | 9 | 10 | 11 | 12 | 13 | 14 |
| Component A | 65.19 | 65.19 | 65.19 | 65.19 | 65.19 | 65.19 |
| Component B | 31.07 | 31.07 | 23.8 | 23.8 | 26.2 | 26.2 |
| Initiator from Example 1 | 1.67 | | | | | |
| Initiator from Example 2 | | 2.95 | | | | |
| Initiator from Example 3 | | | 2.95 | | | |
| Initiator from Example 6 | | | | 2.95 | | |
| Initiator from Example 4 | | | | | 2.59 | |
| Initiator from Example 5 | | | | | | 2.59 |
| Volatility in % | 0 | 0 | 0 | 0 | 2.1 | 1.1 |

All of the samples exhibit no loss or very little loss of photoinitiator, indicating that there is optimum incorporation of the photoinitiator in the formulation to be cured and that photoinitiator does not escape from the formulation during the thermal process.

What is claimed is:

1. An incorporable photoinitiator compound of formula I

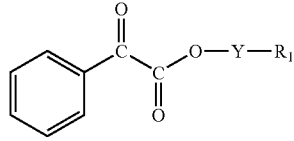  (I)

wherein
Y is $C_4$-$C_{12}$alkylene interrupted one or more times by non-consecutive —O— and
$R_1$ is OH.

2. An incorporable photoinitiator compound of formula I according to claim 1 wherein
Y is —$CH_2CH_2$—O—$CH_2CH_2$—.

3. A photopolymerizable composition comprising
(a) at least one ethylenically unsaturated photopolymerizable compound and
(b) as photoinitiator, at least one compound of formula I according to claim 1.

4. A composition according to claim 3 comprising, in addition to component (b), also further initiators (c) and/or additives (d).

5. A composition according to claim 4 comprising further initiators (c) selected from the group consisting of formulae VIII, IX, X, XI and XII

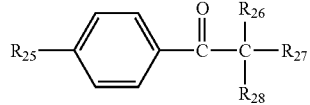  (VIII)

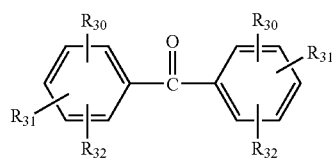  (IX)

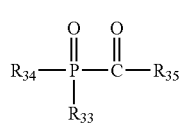  (X)

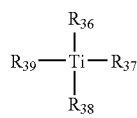  (XI)

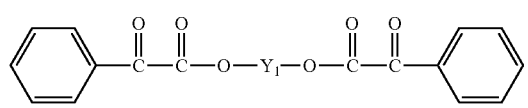  (XII)

wherein
$R_{25}$ is hydrogen, $C_1$-$C_{18}$alkyl, $C_1$-$C_{18}$alkoxy, —$OCH_2CH_2$—$OR_{29}$, morpholino, $SCH_3$, or a group

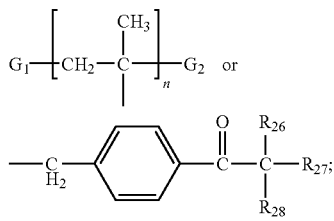

n is from 2 to 10;
$G_1$ and $G_2$ are each independently of the other hydrogen or $CH_3$;
$R_{28}$ is hydroxy, $C_1$-$C_{16}$alkoxy, morpholino, dimethylamino or —$O(CH_2CH_2O)_m$—$C_1$-$C_{16}$alkyl;
$R_{27}$ and $R_{28}$ are each independently of the other hydrogen, $C_1$-$C_6$alkyl, phenyl, benzyl, allyl, $C_1$-$C_{16}$alkoxy or —$O(CH_2CH_2O)_m$—$C_1$-$C_{16}$alkyl, or $R_{27}$ and $R_{28}$, together with the carbon atom to which they are bonded, form a cyclohexyl ring;
m is a number from 1 to 20;
wherein $R_{26}$, $R_{27}$ and $R_{28}$ are not all simultaneously $C_1$-$C_{16}$alkoxy or —$O(CH_2CH_2O)_m$—$C_1$-$C_{16}$alkyl, and $R_{29}$ is hydrogen,

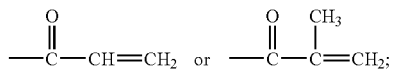

$R_{30}$ and $R_{32}$ are each independently of the other hydrogen or methyl;
$R_{31}$ is hydrogen, methyl, 2-hydroxyethylthio or phenylthio, the phenyl ring of the phenylthio radical being unsubstituted or substituted by $C_1$-$C_4$alkyl in the 4-, 2-, 2,4- or 2,4,6-position;
$R_{33}$ and $R_{34}$ are each independently of the other $C_1$-$C_{20}$alkyl, cyclohexyl, cyclopentyl, phenyl, naphthyl or biphenyl, those radicals being unsubstituted or substituted by halogen, $C_1$-$C_{12}$alkyl or/and by $C_1$-$C_{12}$alkoxy, or $R_{33}$ is an S— or N— containing 5- or 6-membered heterocyclic ring or

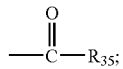

$R_{35}$ is cyclohexyl, cyclopentyl, phenyl, naphthyl or biphenyl, those radicals being unsubstituted or substituted by one or more halogen, $C_1$-$C_4$alkyl or/and $C_1$-$C_4$alkoxy substituents, or $R_{35}$ is an S— or N— containing 5- or 6-membered heterocyclic ring;
$R_{36}$ and $R_{37}$ are each independently of the other cyclopentadienyl that is unsubstituted or mono-, di- or tri-substituted by $C_1$-$C_{18}$alkyl, $C_1$-$C_{18}$alkoxy, cyclopentyl, cyclohexyl or by halogen; and
$R_{38}$ and $R_{39}$ are each independently of the other phenyl, which is substituted by fluorine atoms or $CF_3$ in at least one of the two positions ortho to the titanium carbon bond and which may contain, as further substituent on the aromatic ring, pyrrolinyl or polyoxaalkyl each of which is unsubstituted or substituted by one or two $C_1$-$C_{12}$alkyl, di($C_1$-$C_{12}$alkyl)aminomethyl, morpholinomethyl, $C_2$-$C_4$alkenyl, methoxymethyl, ethoxymethyl, trimethylsilyl, formyl, methoxy or phenyl groups, or $R_{38}$ and $R_{39}$ are

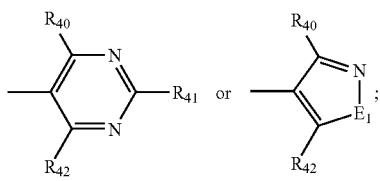

$R_{40}$, $R_{41}$ and $R_{42}$ are each independently of the others hydrogen, halogen, $C_2$-$C_{12}$alkenyl, $C_1$-$C_{12}$alkoxy, $C_2$-$C_{12}$alkoxy interrupted by from one to four oxygen atoms, cyclohexyloxy, cyclopentyloxy, phenoxy, benzyloxy, unsubstituted or $C_1$-$C_4$alkoxy-, halo-, phenylthio- or $C_1$-$C_4$alkylthio-substituted phenyl or biphenyl, wherein $R_{40}$ and $R_{42}$ are not both simultaneously hydrogen and, in the radical

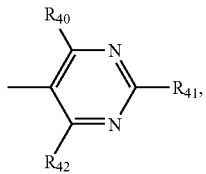

at least one radical $R_{40}$ or $R_{42}$ is $C_1$-$C_{12}$alkoxy, $C_2$-$C_{12}$alkoxy interrupted by from one to four oxygen atoms, cyclohexyloxy, cyclopentyloxy, phenoxy or benzyloxy;

$E_1$ is O, S or $NR_{43}$;

$R_{43}$ is $C_1$-$C_8$alkyl, phenyl or cyclohexyl; and $Y_1$ is $C_3$-$C_{12}$alkylene, butenylene, butynylene, or $C_4$-$C_{12}$alkylene interrupted one or more times by nonconsecutive —O— or —$NR_{44}$—, or $Y_1$ is phenylene, cyclohexylene,

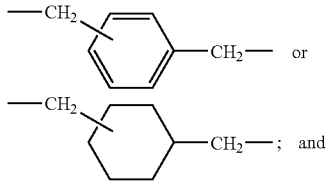

$R_{44}$ is hydrogen, $C_1$-$C_4$alkyl or $C_2$-$C_4$hydroxyalkyl.

6. A composition according to claim 5 wherein $R_{25}$ is hydrogen, —OCH$_2$CH$_2$—OR$_{29}$, morpholino, SCH$_3$ or a group

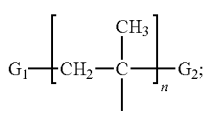

$R_{26}$ is hydroxy, $C_1$-$C_{16}$alkoxy, morpholino or dimethylamino;

$R_{27}$ and $R_{28}$ are each independently of the other $C_1$-$C_4$alkyl, allyl, phenyl, benzyl or $C_1$-$C_{16}$alkoxy, or $R_{27}$ and $R_{28}$, together with the carbon atom to which they are bonded, form a cyclohexyl ring;

$R_{29}$ is hydrogen or

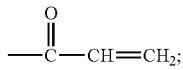

$R_{30}$, $R_{31}$ and $R_{32}$ are hydrogen;

$R_{33}$ is $C_1$-$C_{12}$alkyl, unsubstituted phenyl or phenyl substituted by $C_1$-$C_{12}$alkyl or/and by $C_1$-$C_{12}$alkoxy;

$R_{34}$ is

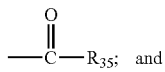

$R_{35}$ is phenyl, which is substituted by one or more $C_1$-$C_4$alkyl or/and $C_1$-$C_4$alkoxy substituents.

7. A composition according to claim 5, containing from 0.05 to 20% by weight of photoinitiator components (b)+(c).

8. A composition according to claim 3, containing from 0.05 to 20% by weight of the photoinitiator component (b).

9. A composition according to claim 3 that, in addition to comprising the photochemically curing component, also contains a thermally curable component.

10. A composition according to claim 3 that further comprises an isocyanate component.

11. A process for the photopolymerization of a non-volatile monomeric, oligomeric or polymeric compound containing at least one ethylenically unsaturated double bond, wherein a composition according to claim 3 is irradiated with light in the range from 200 to 600 nm.

12. A process according to claim 11 for the preparation of pigmented and unpigmented surface-coating compositions, printing inks, screen printing inks, offset printing inks, flexographic printing inks, powder coatings, printing plates, adhesives, dental compositions, optical waveguides, optical switches, color test systems, composite materials, glass fiber cable coatings, screen printing stencils, resist materials, color filters, gel coats (thin layers), in the encapsulation of electrical and electronic components, in the production of magnetic recording materials, of three-dimensional objects by means of stereolithography, of photographic reproductions, image-recording material, holographic recordings, in the production of decolorising materials, decolorising materials for image-recording materials, or in the production of image-recording materials using microcapsules.

13. A coated substrate that is coated on at least one surface with a composition according to claim 3.

14. A process for the photographic production of relief images in which a coated substrate according to claim 13 is exposed imagewise and then the unexposed portions are removed using a solvent.

* * * * *

UNITED STATES PATENT AND TRADEMARK OFFICE
CERTIFICATE OF CORRECTION

PATENT NO. : 7,588,880 B2
APPLICATION NO. : 10/512300
DATED : September 15, 2009
INVENTOR(S) : Wolf et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 278 days.

Signed and Sealed this

Twenty-first Day of September, 2010

David J. Kappos
*Director of the United States Patent and Trademark Office*